(12) United States Patent
Okita et al.

(10) Patent No.: US 8,533,316 B2
(45) Date of Patent: Sep. 10, 2013

(54) MANAGEMENT COMPUTER FOR SETTING CONFIGURATION INFORMATION OF NODE

(75) Inventors: Hideki Okita, Tachikawa (JP); Yoji Ozawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1094 days.

(21) Appl. No.: 12/071,538

(22) Filed: Feb. 22, 2008

(65) Prior Publication Data

US 2008/0267090 A1  Oct. 30, 2008

(30) Foreign Application Priority Data

Apr. 27, 2007 (JP) ................................. 2007-118360
Dec. 28, 2007 (JP) ................................. 2007-339630

(51) Int. Cl.
*G06F 15/173* (2006.01)

(52) U.S. Cl.
USPC ............ 709/224; 709/217; 709/220; 709/223

(58) Field of Classification Search
USPC ................................................. 709/217–226
See application file for complete search history.

(56) References Cited

U.S. PATENT DOCUMENTS 6,701,358 B1 * 3/2004 Poisson et al. ................ 709/223
7,133,907 B2 * 11/2006 Carlson et al. ............... 709/223
2003/0189898 A1 * 10/2003 Frick et al. ................... 370/227
2005/0281272 A1 * 12/2005 Chandrapal .................. 370/401
2006/0187853 A1 * 8/2006 Mititelu ....................... 370/254
2006/0274674 A1 12/2006 Okita et al.
2007/0076634 A1 4/2007 Sumiyoshi et al.
2007/0177604 A1 8/2007 Ozawa et al.

FOREIGN PATENT DOCUMENTS

| JP | 2006-340161 | 6/2005 |
|----|-------------|--------|
| JP | 2007-104350 | 10/2005 |
| JP | 2007-208711 | 2/2006 |

* cited by examiner

*Primary Examiner* — Thomas Dailey
*Assistant Examiner* — Nam Tran
(74) *Attorney, Agent, or Firm* — Stites & Harbison, PLLC; Juan Carlos A. Marquez, Esq.

(57) ABSTRACT

Provided is a management computer which reduces the workload of an administrator of a network in setting node when the normal network is changed to a network with redundancy. The management computer manages a plurality of nodes that constitute a network accommodating VLANs. The plurality of nodes include a first node and a second node which make a redundancy pair and which divides the network into an active path and a standby path. The management computer stores port management information showing connection relations for respective nodes and identifiers of VLANs allocated to ports of the nodes, and creates the redundancy pair by updating the port management information of the first node such that a VLAN allocated to one of ports of a connected node that is connected to the first node is allocated to one of ports of the first node that is connected to the connected node.

7 Claims, 26 Drawing Sheets

|  | 21301 | 21302 | 21303 | 21304 |
|---|---|---|---|---|
|  | PORT IDENTIFIER | CONNECTED NODE IDENTIFIER | CONNECTED PORT IDENTIFIER | VLAN IDENTIFIER |
|  | 0 | 302 | 6 | 99 |
|  | 1 | 303 | 6 | 10, 20, 99 |
|  | 2 | 304 | 6 | 10, 20, 99 |
|  | 3 |  |  |  |
|  | 4 |  |  |  |
|  | 5 |  |  |  |
|  | 6 |  |  |  |
|  | 7 |  |  |  |

|  | 21301 | 21302 | 21303 | 21304 |
|---|---|---|---|---|
|  | PORT IDENTIFIER | CONNECTED NODE IDENTIFIER | CONNECTED PORT IDENTIFIER | VLAN IDENTIFIER |
|  | 0 | 999 |  | 99 |
|  | 1 |  |  |  |
|  | 2 |  |  |  |
|  | 3 |  |  |  |
|  | 4 |  |  |  |
|  | 5 |  |  |  |
|  | 6 | 301 | 0 | 99 |
|  | 7 |  |  |  |

| PORT IDENTIFIER 21301 | CONNECTED NODE IDENTIFIER 21302 | CONNECTED PORT IDENTIFIER 21303 | VLAN IDENTIFIER 21304 |
|---|---|---|---|
| 0 | 999 | | 10 |
| 1 | 999 | | 20 |
| 2 | | | |
| 3 | | | |
| 4 | | | |
| 5 | | | |
| 6 | 301 | 1 | 10, 20, 99 |
| 7 | | | |

| PORT IDENTIFIER 21301 | CONNECTED NODE IDENTIFIER 21302 | CONNECTED PORT IDENTIFIER 21303 | VLAN IDENTIFIER 21304 |
|---|---|---|---|
| 0 | 999 | | 20 |
| 1 | 999 | | 10 |
| 2 | | | |
| 3 | | | |
| 4 | | | |
| 5 | | | |
| 6 | 301 | 2 | 10, 20, 99 |
| 7 | | | |

| VLAN IDENTIFIER | PORT IDENTIFIER | IP ADDRESS |
|---|---|---|
| 10 | 1, 2 | 192. 168. 10. 201 |
| 20 | 1, 2 | 192. 168. 20. 201 |
| 99 | 0, 1, 2 | 192. 168. 99. 1 |

*FIG. 10*

| VLAN IDENTIFIER | PORT IDENTIFIER | IP ADDRESS |
|---|---|---|
| 99 | 0, 6 | 192. 168. 99. 2 |

*FIG. 11*

| VLAN IDENTIFIER 21201 | PORT IDENTIFIER 21202 | IP ADDRESS 21203 |
|---|---|---|
| 10 | 0, 6 | 192. 168. 10. 203 |
| 20 | 1, 6 | 192. 168. 10. 203 |
| 99 | 6 | 192. 168. 99. 3 |

| VLAN IDENTIFIER 21201 | PORT IDENTIFIER 21202 | IP ADDRESS 21203 |
|---|---|---|
| 10 | 1, 6 | 192. 168. 10. 204 |
| 20 | 0, 6 | 192. 168. 20. 204 |
| 99 | 6 | 192. 168. 99. 4 |

|  | 21301 | 21302 | 21303 | 21304 |
|---|---|---|---|---|
|  | PORT IDENTIFIER | CONNECTED NODE IDENTIFIER | CONNECTED PORT IDENTIFIER | VLAN IDENTIFIER |
|  | 0 | 302 | 6 | 99 |
|  | 1 | 303 | 6 | 10, 20, 99 |
|  | 2 | 304 | 6 | 10, 20, 99 |
|  | 3 |  |  |  |
|  | 4 |  |  |  |
|  | 5 |  |  |  |
|  | 6 |  |  |  |
|  | 7 | 305 | 7 | 200 |

| PORT IDENTIFIER | CONNECTED NODE IDENTIFIER | CONNECTED PORT IDENTIFIER | VLAN IDENTIFIER |
|---|---|---|---|
| 0 | 999 |  | 99 |
| 1 |  |  |  |
| 2 |  |  |  |
| 3 |  |  |  |
| 4 |  |  |  |
| 5 |  |  |  |
| 6 | 301 | 0 | 99 |
| 7 | 305 | 0 | 99 |

|  21301<br>PORT IDENTIFIER | 21302<br>CONNECTED NODE IDENTIFIER | 21303<br>CONNECTED PORT IDENTIFIER | 21304<br>VLAN IDENTIFIER |
|---|---|---|---|
| 0 | 999 |  | 10 |
| 1 | 999 |  | 20 |
| 2 |  |  |  |
| 3 |  |  |  |
| 4 |  |  |  |
| 5 |  |  |  |
| 6 | 301 | 1 | 10, 20, 99 |
| 7 | 305 | 1 | 10, 20, 99 |

|  21301<br>PORT IDENTIFIER | 21302<br>CONNECTED NODE IDENTIFIER | 21303<br>CONNECTED PORT IDENTIFIER | 21304<br>VLAN IDENTIFIER |
|---|---|---|---|
| 0 | 999 |  | 20 |
| 1 | 999 |  | 10 |
| 2 |  |  |  |
| 3 |  |  |  |
| 4 |  |  |  |
| 5 |  |  |  |
| 6 | 301 | 2 | 10, 20, 99 |
| 7 | 305 | 2 | 10, 20, 99 |

| PORT IDENTIFIER 21301 | CONNECTED NODE IDENTIFIER 21302 | CONNECTED PORT IDENTIFIER 21303 | VLAN IDENTIFIER 21304 |
|---|---|---|---|
| 0 | 302 | 7 | 99 |
| 1 | 303 | 7 | 10, 20, 99 |
| 2 | 304 | 7 | 10, 20, 99 |
| 3 | | | |
| 4 | | | |
| 5 | | | |
| 6 | | | |
| 7 | 301 | 7 | 200 |

| VLAN IDENTIFIER 21201 | PORT IDENTIFIER 21202 | IP ADDRESS 21203 |
|---|---|---|
| 99 | 6, 7 | 192. 168. 99. 2 |

FIG. 24 — 2123

| VLAN IDENTIFIER 21201 | PORT IDENTIFIER 21202 | IP ADDRESS 21203 |
|---|---|---|
| 10 | 0, 6, 7 | 192. 168. 10. 203 |
| 20 | 1, 6, 7 | 192. 168. 20. 203 |
| 99 | 6, 7 | 192. 168. 99. 3 |

FIG. 25 — 2124

| VLAN IDENTIFIER 21201 | PORT IDENTIFIER 21202 | IP ADDRESS 21203 |
|---|---|---|
| 10 | 1, 6, 7 | 192. 168. 10. 204 |
| 20 | 0, 6, 7 | 192. 168. 20. 204 |
| 99 | 6, 7 | 192. 168. 99. 4 |

| VLAN IDENTIFIER 21201 | PORT IDENTIFIER 21202 | IP ADDRESS 21203 |
|---|---|---|
| 10 | 1, 2 | 192. 168. 10. 201 |
| 20 | 1, 2 | 192. 168. 10. 201 |
| 99 | 0, 1, 2 | 192. 168. 99. 1 |
| 200 | 7 | 192. 168. 200. 1 |

| VLAN IDENTIFIER 21201 | PORT IDENTIFIER 21202 | IP ADDRESS 21203 |
|---|---|---|
| 10 | 1, 2 | 192. 168. 10. 205 |
| 20 | 1, 2 | 192. 168. 20. 205 |
| 99 | 0, 1, 2 | 192. 168. 99. 5 |
| 200 | 7 | 192. 168. 200. 5 |

| PAIR IDENTIFIER | FIRST NODE IDENTIFIER | FIRST PORT IDENTIFIER | SECOND NODE IDENTIFIER | SECOND PORT IDENTIFIER |
|---|---|---|---|---|
| 1 | 301 | 7 | 305 | 7 |
| | | | | |

*FIG. 28*

```
<config>
    <port id=7>
        <vlan-add id=200 type=trunk/>
    </port>
</config>
```
— 2051

FIG. 29

```
<config>
    <port id=7>
        <vlan-add id=99 type=trunk/>
    </port>
</config>
```
— 2052

FIG. 30

```
<config>
    <port id=7>
        <vlan-add id=10 type=trunk/>
        <vlan-add id=20 type=trunk/>
        <vlan-add id=99 type=trunk/>
    </port>
</config>
```
— 2053

FIG. 31

```
<config>
    <port id=7>
        <vlan-add id=10 type=trunk/>
        <vlan-add id=20 type=trunk/>
        <vlan-add id=99 type=trunk/>
    </port>
</config>
```
— 2054

FIG. 32

```
<config>
   <port id=0>
      <vlan-add id=99 type=trunk/>
   </port>
   <port id=1>
      <vlan-add id=10 type=trunk/>
      <vlan-add id=20 type=trunk/>
      <vlan-add id=99 type=trunk/>
   </port>
   <port id=2>
      <vlan-add id=10 type=trunk/>
      <vlan-add id=20 type=trunk/>
      <vlan-add id=99 type=trunk/>
   </port>
   <port id=7>
      <vlan-add id=200 type=trunk/>
   </port>
</config>
```

MANAGEMENT COMPUTER FOR SETTING CONFIGURATION INFORMATION OF NODE

CLAIM OF PRIORITY

The present application claims priorities from Japanese patent application P2007-118360 filed on Apr. 27, 2007, and Japanese patent application P2007-339630 filed on Dec. 28, 2007, the content of which are hereby incorporated by reference into this application.

BACKGROUND OF THE INVENTION

This invention relates to a management computer for network management and, more particularly, to a management computer that automatically sets switches constituting a network.

The networking of business operations (including mission-critical applications) in a corporation has lately become increasingly common, which has created a demand for improved network availability.

In a conventional network, a failure in a network device such as a switch or a router is dealt with by the administrator of the network by manually replacing the failed network device. This lowers the availability of the network significantly since communication cannot be held over the network until the failed network device is replaced with a functioning one.

There has been known a protocol called spanning tree protocol (STP). The STP is for controlling switches that constitute a network such that the network recovers automatically from a failure. When a failure occurs in the network, the switches autonomously execute processing of recovering from the network failure using the STP. The STP, with which failure recovery processing is automatically executed upon failure in a network, improves the network availability, compared to manual recovery from a network failure by a network administrator.

A virtual router redundancy protocol (VRRP) and a gigabit switch redundancy protocol (GSRP) are protocols that can improve the network availability even more. The extent to which these protocols are effective for recovery from a failure is limited to adjacent (interconnected) network devices. The VRRP and GSRP are control protocols for redundancy switches formed of an active switch and a standby switch. The VRRP and GSRP win hereinafter be referred to as redundant system control protocols.

With redundant system control protocols whose failure recovery extent is limited to adjacent network appliances, a network can recover from a failure more quickly than when the STP is employed.

To apply a redundant system control protocol, the administrator of a network connects both switches that constitute redundancy switches to other switches in the network. The network administrator then sets an active path which runs through one of the switches constituting the redundancy switches and a standby path which runs through the other switch constituting the redundancy switches. Of the two switches constituting the redundancy switches, the one through which the active path runs is called an active switch and the one through which the standby path runs is called a standby switch.

The network administrator activates the redundant system control protocol between the active switch and the standby switch. The active switch uses the redundant system control protocol to monitor the operation state of the standby switch while the standby switch uses the redundant system control protocol to monitor the operation state of the active switch.

One of ports that the standby switch has is connected to the active switch and the rest of the ports are set to a standby state in which communication is stopped until a failure occurs in the active switch. The ports in the standby state are subjects of automatic recovery processing which is executed with the use of the redundant system control protocol.

In the case where the redundant system control protocol is the GSRP, the network administrator sets one of ports of the active switch that is connected to the standby switch and the port of the standby switch that is connected to the active switch as ports that are used in mutual switch monitoring communication according to the GSRP.

SUMMARY OF THE INVENTION

The network administrator logically partitions the network to build a plurality of virtual LANs (VLAN: Virtual Local Area Network) within the network constituted of switches. The network administrator controls access to the VLANs from user terminals by specifying (defining) for each switch which port accesses which VLAN. A port that is connected to a switch transfers packets of a plurality of VLANs in a multiplexed fashion, and the network administrator therefore must assign a plurality of VLANs to a port that is connected to a switch.

To apply a redundant system control protocol to a network that is constituted of switches to which VLANs are assigned, the administrator of the network sets, for every VLAN that is to be provided redundancy, two switches constituting redundancy switches and a plurality of switches connected to the redundancy switches. The network administrator needs to set the ports such that ports on the active path and ports on the standby path are allocated to the same VLAN in order to ensure that the same VLAN is accessed either via the active path or via the standby path.

In installing a new switch to a network, the administrator of the network has to set the connection relation between the new switch to be introduced and existing switches, and VLANs to be allocated to ports of the new switch as well as ports of the existing switches. The network administrator also needs to design the network configuration such that two switches constituting redundancy switches are connected directly in the case where the GSRP is employed as a redundant system control protocol.

To change an existing network that does not have a redundancy configuration into a redundancy configuration network by adding a new switch to the existing network, the administrator of the network has to change the settings of an existing switch that is to be provided redundancy, the settings of the new switch, and the settings of all switches that are to be connected to the existing switch to be provided redundancy and to the new switch.

Specifically, the network administrator has to set the inter-switch connection relation and VLANs for all of the above switches. This means that the larger the network scale, the more switches need settings change by the network administrator. An increase in network scale therefore increases the workload of the network administrator, who will find it difficult to change the settings of switches correctly and timely.

This invention has been made in view of the above, and it is a first object of this invention to facilitate the introduction of a redundancy configuration to a large-scale network by reducing the workload of the administrator of the network that is required to change the settings of switches.

In a large-scale network where the administrator of the network has a greater workload in changing the settings of switches, the probability that the network administrator makes mistakes in setting switches is higher than in networks of smaller scale. Setting switches erroneously is a factor in the lowering of network availability.

It is a second object of this invention to reduce switch setting errors in a large-scale network when the network configuration is changed by reducing the workload of the administrator of the network that is required to change the settings of switches.

According to one embodiment of the invention, there is therefore provided a management computer connected to a plurality of nodes each having a plurality of ports, comprising: a transmission module for sending a configuration definition to each of the plurality of nodes; an input module for receiving an input of network configuration information containing free port information of each of the plurality of nodes and information on a VLAN set between at least two of the plurality of nodes; and a display module for using graphics representing the plurality of nodes and connection relations between the plurality of nodes to display latest network configuration information reflecting the network configuration information received as the input, wherein the input module further receives a selection of one of a node and a connection relation that is selected, out of the plurality of nodes and the connection relations, to be provided redundancy, wherein the display module further displays the network configuration information including a redundancy configuration with the use of graphics representing the plurality of nodes, the node that has been provided redundancy, the connection relations, and the connection relation that has been provided redundancy, wherein the input module further receives an input of a confirmation of the network configuration information, and wherein, based on the input of the confirmation, the transmission module sends, to each of the plurality of nodes, respective configuration definitions of the plurality of nodes in a network configuration with the redundancy configuration.

According to a mode of this invention, less workload is required of the administrator of a network to set switches when the network is changed into a network that has redundancy.

BRIEF DESCRIPTION OF THE DRAWINGS

The present invention can be appreciated by the description which follows in conjunction with the following figures, wherein:

FIG. 6 is a diagram showing the configuration of a port information management table which is created for the switch after a network configuration is entered by the administrator according to the first embodiment of this invention;

FIG. 7 is a diagram showing the configuration of a port information management table which is created for the switch after a network configuration is entered by the administrator according to the first embodiment of this invention;

FIG. 8 is a diagram showing the configuration of a port information management table which is created for the switch after a network configuration is entered by the administrator according to the first embodiment of this invention;

FIG. 9 is a diagram showing the configuration of a port information management table which is created for the switch after a network configuration is entered by the administrator according to the first embodiment of this invention;

FIG. 10 is a diagram showing the configuration of a VLAN information management table which is created for the switch after a network configuration is entered by the administrator according to the first embodiment of this invention;

FIG. 11 is a diagram showing the configuration of a VLAN information management table which is created for the switch after a network configuration is entered by the administrator according to the first embodiment of this invention;

FIG. 12 is a diagram showing the configuration of a VLAN information management table which is created for the switch after a network configuration is entered by the administrator according to the first embodiment of this invention;

FIG. 13 is a diagram showing the configuration of a VLAN information management table which is created for the switch after a network configuration is entered by the administrator according to the first embodiment of this invention;

FIG. 18 is a diagram showing the port information management table for the switch to be provided redundancy that has been updated through the redundancy configuration creating processing according to the first embodiment of this invention;

FIG. 19 is a diagram showing the port information management table for the switch that has been updated through the redundancy configuration creating processing according to the first embodiment of this invention;

FIG. 20 is a diagram showing the port information management table for the switch that has been updated through the redundancy configuration creating processing according to the first embodiment of this invention;

FIG. 21 is a diagram showing the port information management table for the switch that has been updated through the redundancy configuration creating processing according to the first embodiment of this invention;

FIG. 22 is a diagram showing the port information management table for the switch that has been updated through the redundancy configuration creating processing according to the first embodiment of this invention;

FIG. 23 is a diagram showing the VLAN information management table for the switch that has been updated through the redundancy configuration creating processing according to the first embodiment of this invention;

FIG. 24 is a diagram showing the VLAN information management table 2123 for the switch that has been updated through the redundancy configuration creating processing according to the first embodiment of this invention;

FIG. 25 is a diagram showing the VLAN information management table for the switch that has been updated through the redundancy configuration creating processing according to the first embodiment of this invention;

FIG. 26 is a diagram showing the VLAN information management table for the switch to be provided redundancy that has been updated through the redundancy configuration creating processing according to the first embodiment of this invention;

FIG. 27 is a diagram showing a VLAN information management table 2125 for the new switch that has been updated through the redundancy configuration creating processing according to the first embodiment of this invention;

FIG. 28 is a diagram showing the redundant system management table that has been updated through the redundancy configuration creating processing according to the first embodiment of this invention;

FIG. 29 is a diagram illustrating an update message 2051 for updating the settings of the switch according to the first embodiment of this invention;

FIG. 30 is a diagram illustrating an update message 2052 for updating the settings of the switch according to the first embodiment of this invention;

FIG. 31 is a diagram illustrating an update message 2053 for updating the settings of the switch according to the first embodiment of this invention;

FIG. 32 is a diagram illustrating an update message for updating the settings of the switch according to the first embodiment of this invention;

FIG. 33 is a diagram illustrating an update message 2055 for updating the settings of the switch according to the first embodiment of this invention;

DETAILED DESCRIPTION OF THE PREFERRED EMBODIMENTS

First Embodiment

A first embodiment of this invention will be described below with reference to FIGS. 1 to 33.

Figure 1:
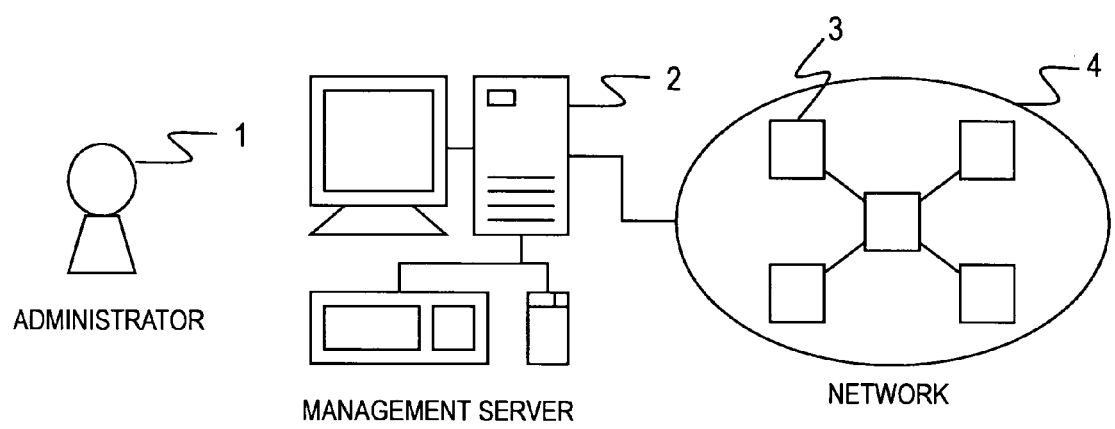
FIG. 1 is a diagram showing the configuration of a computer system according to the first embodiment of this invention.

FIG. 1 is a diagram showing the configuration of a computer system according to the first embodiment of this invention.

This computer system contains a management server 2 and a network 4, which is managed by the management server 2.

An administrator 1 of the network 4 can know the configuration of the network 4 through an input/output device of the management server 2, on which the configuration of the network 4 is displayed. The administrator 1 can also enter an instruction for providing the network 4 redundancy to the input/output device of the management server 2.

The management server 2 is connected to the network 4 to receive link information, which indicates the connection relation between network devices 3. The management server 2 sets the settings of the network devices 3 using a protocol for setting the network devices 3. The network devices 3 are, for example, routers, switches, and user terminals.

Figure 2:
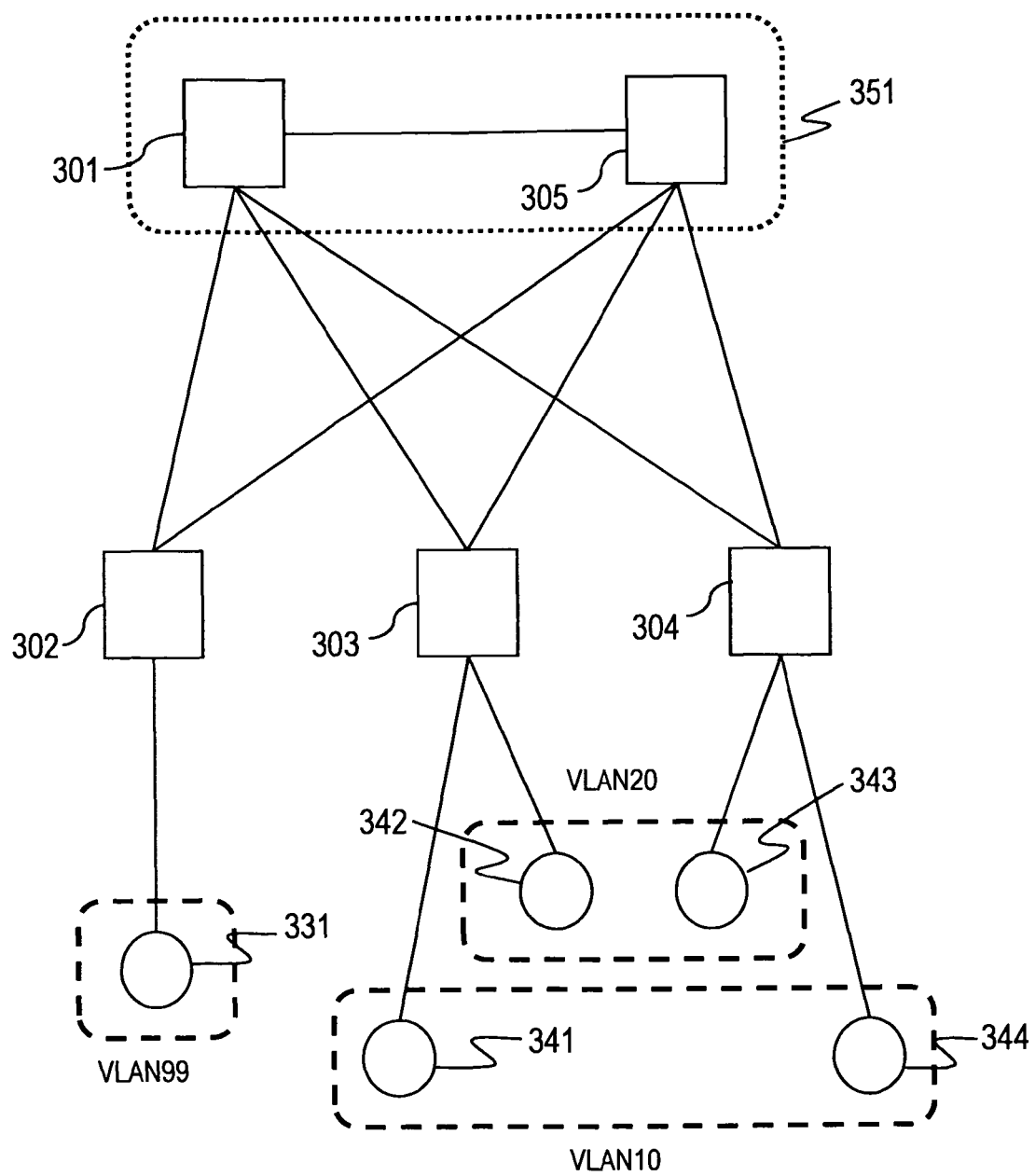
FIG. 2 is a diagram showing the configuration of the network according to the first embodiment of this invention.

FIG. 2 is a diagram showing the configuration of the network 4 according to the first embodiment of this invention.

The network 4 includes the management server 2, switches 301 to 305, and user terminals 341 to 344. The switches 301 to 305 will collectively be referred to as switches 300, and the user terminals 341 to 344 will collectively be referred to as user terminals 340.

The switch 301 and the switch 305 are the most upstream switches of the network 4, and are called core switches 351 which are positioned at the center of the network 4. The switches 301 and 305 are connected directly to each other.

The switches 302 to 304 are floor switches which directly accommodate other devices than the switches 300 (in this embodiment, the management server 2 and the user terminals 341 and 342). The switches 302 to 304 are directly connected to both of the core switches: the switches 301 and 305. This provides redundancy to the switches 301 and 305 which are core switches and, when a failure occurs in one of the switches 301 and 305, the switches 302 to 304 which are floor switches can communicate with either the switch 301 or the switch 305 that is not suffering from the failure.

The management server 2, shown as element 331, is connected to the switch 302 and belongs to a VLAN 99. The user terminals 341 and 342 are connected to the switch 303, and the user terminal 341 belongs to a VLAN 10 whereas the user terminal 342 belongs to a VLAN 20. The user terminals 343 and 344 are connected to the switch 304, and the user terminal 343 belongs to the VLAN 20 whereas the user terminal 344 belongs to the VLAN 10.

Figure 3:
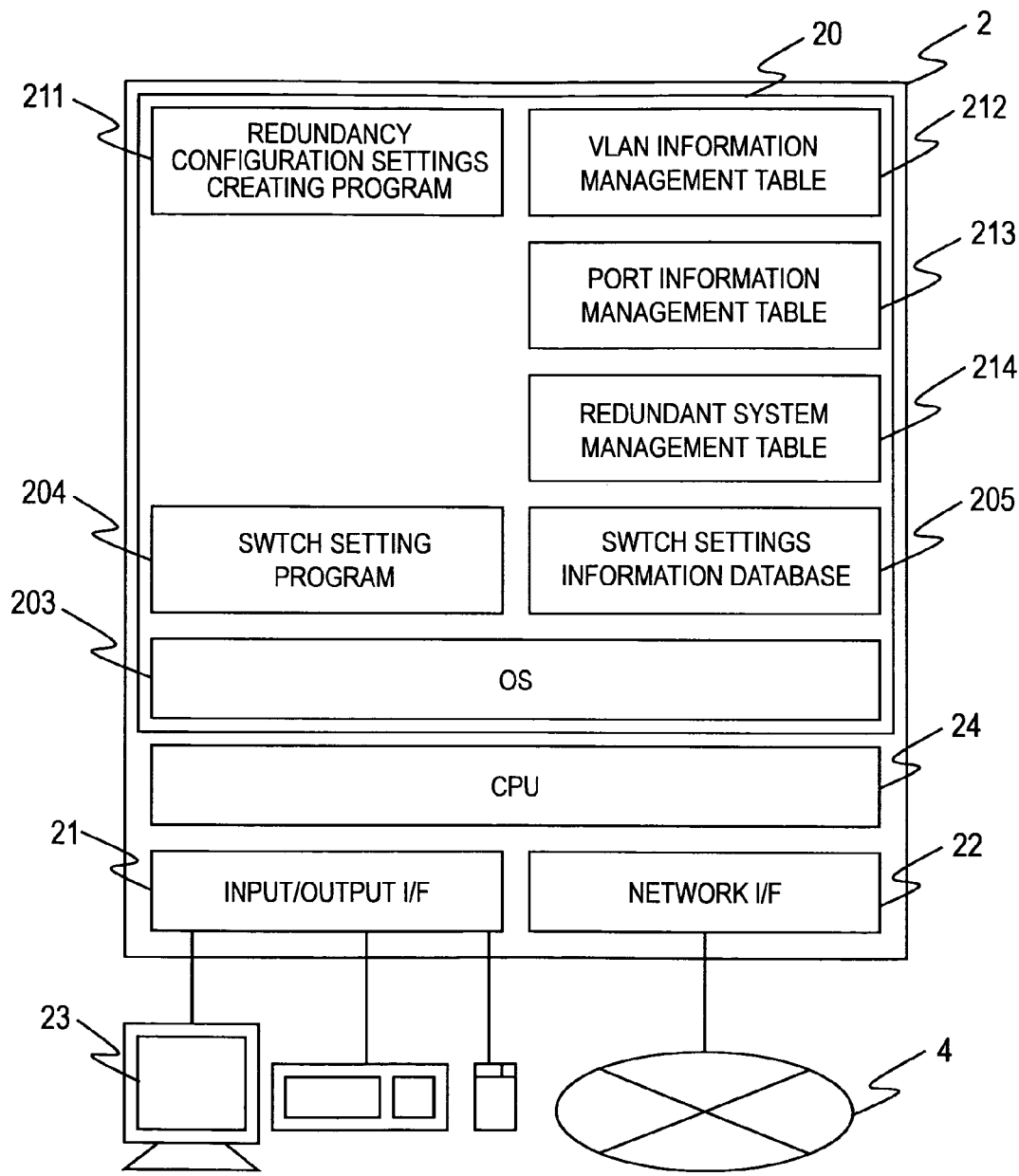
FIG. 3 is a diagram showing the configuration of the management server according to the first embodiment of this invention.

FIG. 3 is a diagram showing the configuration of the management server 2 according to the first embodiment of this invention.

The management server 2 has a memory 20, an input/output interface (I/F) 21, a network interface (I/F) 22, and a CPU 24.

The management server 2 connects with an input/output device 23 via the input/output I/F 21. The input/output device 23 includes, for example, a display, a keyboard, and a mouse. The management server 2 connects with the network 4 via the network I/F 22.

The memory 20 contains an OS 203, an device setting program 204, a redundancy configuration settings creating program 211, an device settings information database 205, a VLAN information management table 212, a port information management table 213, and a redundant system management table 214. The CPU 24 executes various programs loaded onto the memory 20.

The device setting program 204 is run on the OS 203, sets a VLAN to each switch 300, and sets ports that connect the switch 301 and the switch 305 as GSRP ports. The device setting program 204 uses a command line interface, Net.conf, or the like to set the switches 300. The device settings information database 205 holds the settings of the switches 300 in the form of data readable and writable through the OS 203.

The redundancy configuration settings creating program 211 is run on the OS 203 and creates settings for the switches 300 that are necessary to provide redundancy to the network 4.

The VLAN information management table 212 is used to manage VLANs set to the respective switches 300 in the form of data readable and writable through the OS 203 and sorted by switch 300. Details of the VLAN information management table 212 will be described with reference to FIGS. 10 to 13.

The port information management table 213 is used to manage the utilization state of ports of the respective switches 300 in the form of data readable and writable through the OS 203. Details of the port information management table 213 will be described with reference to FIGS. 6 to 9.

The redundant system management table 214 is used to manage the connection relation between two switches that constitute redundancy switches in the form of data readable and writable through the OS 203. Details of the redundant system management table 214 will be described with reference to FIG. 28.

Figure 4:
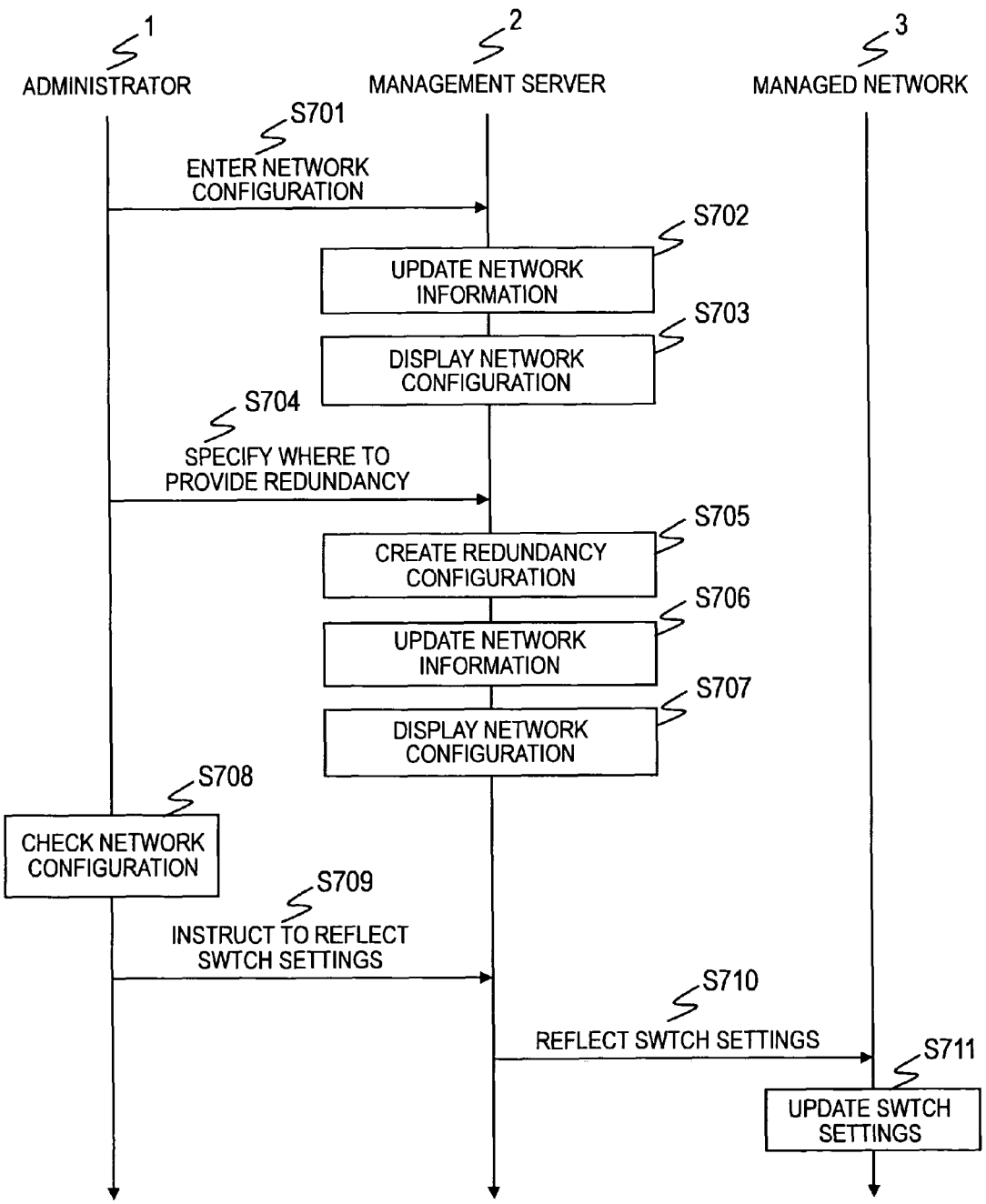
FIG. 4 is a sequence diagram for network designing through the management server according to the first embodiment of this invention.

FIG. 4 is a sequence diagram for network designing through the management server 2 according to the first embodiment of this invention.

First, the administrator 1 enters a network configuration to the management server 2 via a network configuration input screen 230, which is displayed on the input/output device 23 (S701). Details of the network configuration input screen 230 will be described with reference to FIG. 5.

Based on the entered network configuration, the management server 2 updates network information managed in the VLAN information management table 212, the port information management table 213, and the redundant system management table 214 (S702).

The management server 2 then makes the entered network configuration reflected on the network configuration input screen 230 to display the network configuration on the input/output device 23 (S703).

Figure 14:
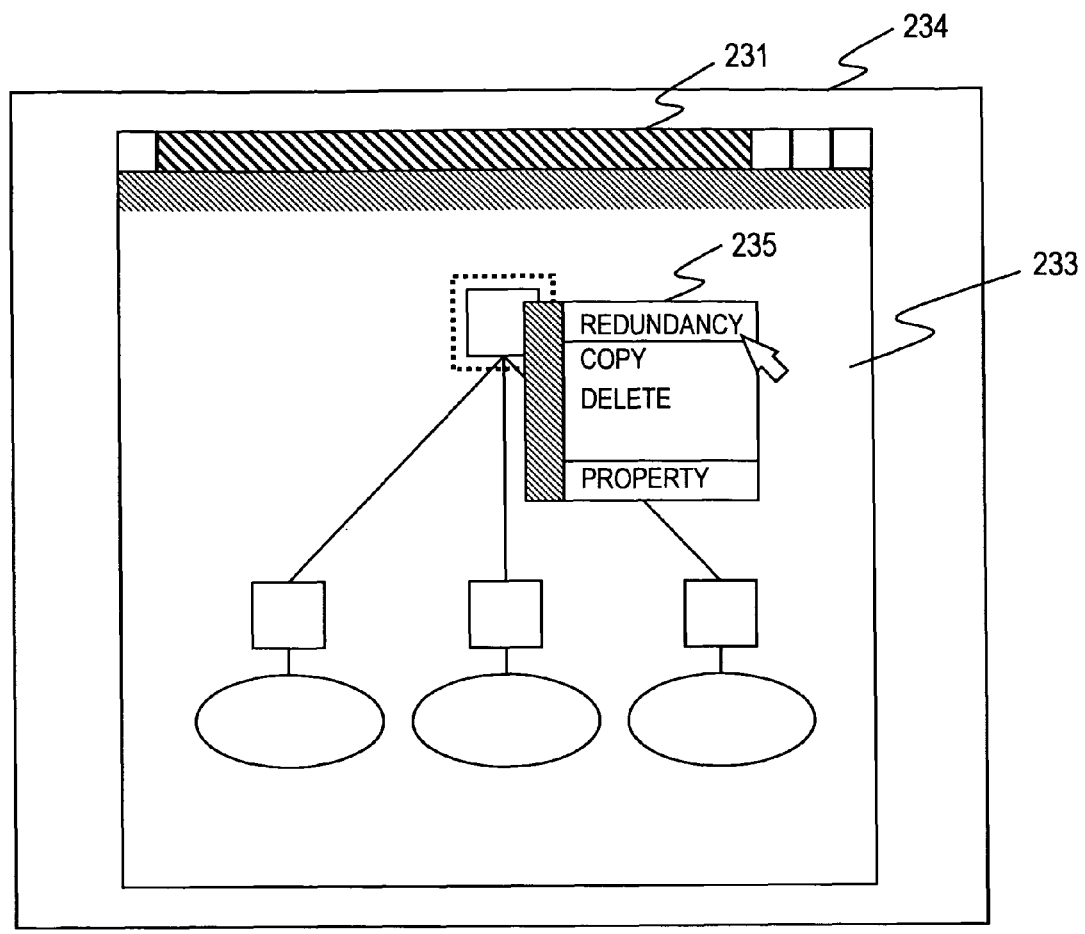
FIG. 14 is a diagram illustrating the redundancy switch specifying screen for specifying which switch is to be provided redundancy according to the first embodiment of this invention.

Next, the administrator 1 specifies which switch 300 is to be provided redundancy via a redundancy switch specifying screen 234, which is shown in FIG. 14, and via the network configuration input screen 230 (S704).

The management server 2 creates a network configuration necessary to give the specified switch 300 redundancy (S705). Based on the created network configuration, the management server 2 updates network information managed in the VLAN information management table 212, the port information management table 213, and the redundant system management table 214 (S706). The management server 2 makes the updated network configuration reflected on the network configuration input screen 230 to display the network configuration on the input/output device 23 (S707).

The administrator 1 checks whether the network configuration that is displayed by the input/output device 23 in the network configuration input screen 230 matches the actual configuration of the network 4 (S708). When the network configuration that is displayed by the input/output device 23 in the network configuration input screen 230 matches the actual configuration of the network 4, the administrator 1 instructs the management server 2 via the input/output device 23 to update the settings of the switches 300 (S709).

Receiving this instruction, the management server 2 sends an instruction to update the settings to the switches 300 (S710). Each switch 300 that has received the instruction from the management server 2 updates its settings (S711).

The management server 2 thus automatically creates settings for the respective switches 300 that are necessary to give the network 4 redundancy and updates the settings of the respective switches 300, thereby reducing the workload of the administrator 1.

Figure 5:
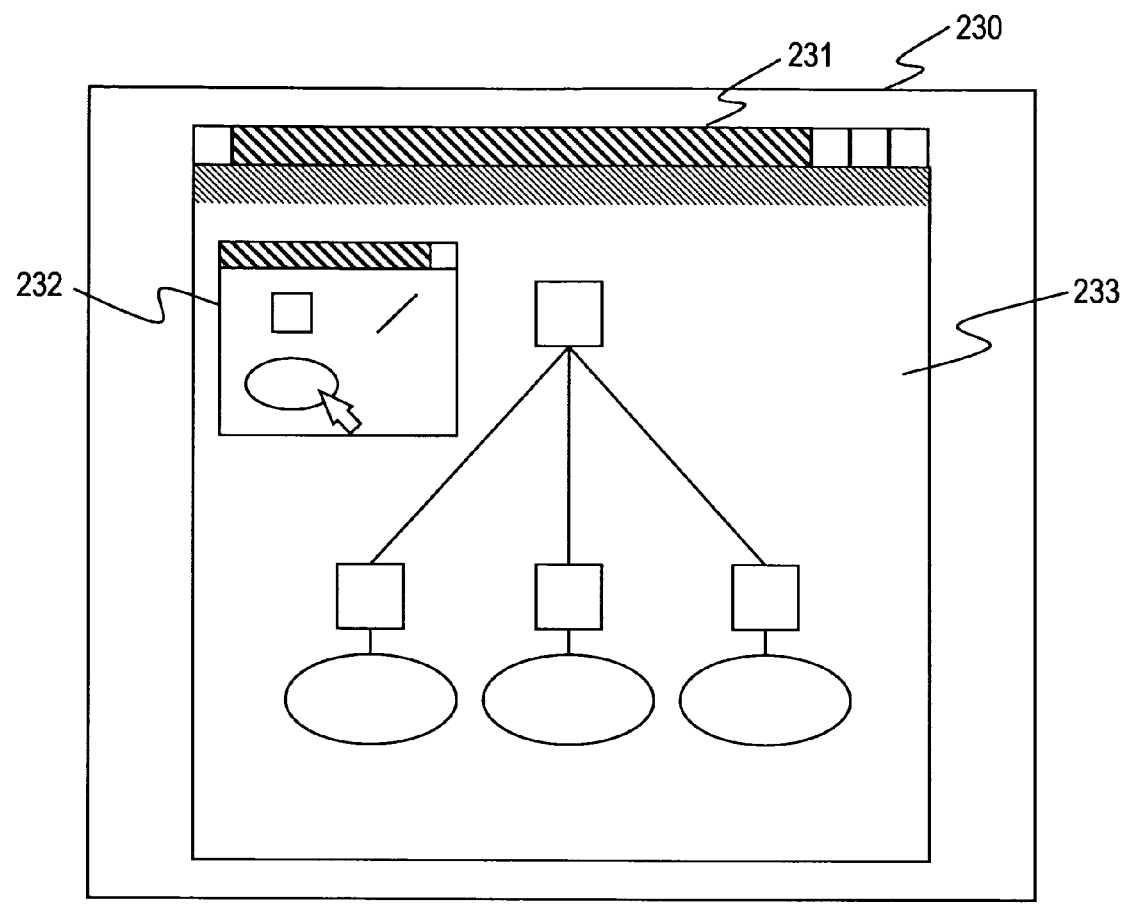
FIG. 5 is a diagram illustrating the network configuration input screen according to the first embodiment of this invention.

FIG. 5 is a diagram illustrating the network configuration input screen 230 according to the first embodiment of this invention.

The network configuration input screen 230 contains an edit window 231, an edit palette 232, and an edit canvas 233.

The edit window 231 is a window used by the administrator 1 to edit the network configuration. The edit palette 232 contains icons representing the switches 300, icons indicating connections between network devices, icons representing the user terminals 340, and the like. Displayed on the edit canvas 233 is a drawing of a network designed by the administrator 1.

The administrator 1 picks up one of the icons in the edit palette 232 and drag-and-drops the icon to place it on the edit canvas 233. The management server 2 newly displays the placed icon on the edit canvas 233. The administrator 1 informs the management server 2 of a new network configuration by operating icons that indicate connections between network devices displayed on the edit canvas 233 in a manner that connects the network devices to one another.

FIGS. 6 to 9 are diagrams showing the configuration of the port information management table 213 according to the first embodiment of this invention.

The port information management table 213 is created for each switch 300 managed by the management server 2.

The port information management table 213 contains in each entry a port identifier 21301, a connected node identifier 21302, a connected port identifier 21303, and a VLAN identifier 21304.

Registered as the port identifier 21301 is an identifier unique to each port of the switch 300 for which the port information management table 213 in question is created.

Registered as the connected node identifier 21302 is an identifier unique to a specific network device that is connected to the port of the switch 300 corresponding to the port information management table 213. When one port of this switch 300 is connected with another switch 300, an identifier unique to the another switch 300 is registered as the connected node identifier 21302. When one port of this switch 300 is connected with one of the user terminals 340 or with the management server 2, a uniform identifier indicating that the connected device is none of the switches 300 is registered as the connected node identifier 21302. The identifier indicating that the connected device is none of the switches 300 is "999" in this embodiment.

Registered as the connected port identifier 21303 is an identifier unique to a specific port of the connected switch 300 that is connected to the port identified by the port identifier 21301. When the connected node is an device other than the switches 300, nothing is registered as the connected port identifier 21303.

Registered as the VLAN identifier 21304 is an identifier unique to a VLAN that is allocated to a specific port of the switch 300 corresponding to the port information management table 213.

FIG. 6 is a diagram showing the configuration of a port information management table 2131 which is created for the switch 301 after a network configuration is entered by the administrator 1 according to the first embodiment of this invention.

The port information management table 2131 shows that a port "0" of the switch 301 is connected to a port "6" of the switch 302, a port "1" of the switch 301 is connected to a port "6" of the switch 303, and a port "2" of the switch 301 is connected to a port "6" of the switch 304.

The port information management table 2131 also shows that the VLAN 99 is allocated to the port "0" of the switch 301, the VLAN 10, the VLAN 20, and the VLAN 99 are allocated to the port "1" of the switch 301, and the VLAN 10, the VLAN 20, and the VLAN 99 are allocated to the port "2" of the switch 301.

FIG. 7 is a diagram showing the configuration of a port information management table 2132 which is created for the switch 302 after a network configuration is entered by the administrator 1 according to the first embodiment of this invention.

The port information management table 2132 shows that a port "0" of the switch 302 is connected to an device other than the switch 300, and a port "6" of the switch 302 is connected to a port "0" of the switch 301.

The port information management table 2132 also shows that the VLAN 99 is allocated to the port "0" of the switch 302, and the VLAN 99 is allocated to the port "6" of the switch 302.

Since the VLAN 99 is a VLAN for management, the management server 2 is connected to the port "0".

FIG. 8 is a diagram showing the configuration of a port information management table 2133 which is created for the switch 303 after a network configuration is entered by the administrator 1 according to the first embodiment of this invention.

The port information management table 2133 shows that a port "0" of the switch 303 is connected to an device other than the switch 300, a port "1" of the switch 303 is connected to an device other than the switch 300, and a port "6" of the switch 303 is connected to a port "1" of the switch 301.

The port information management table 2133 also shows that the VLAN 10 is allocated to the port "0" of the switch 303, the VLAN 20 is allocated to the port "1" of the switch 303, and the VLAN 10, the VLAN 20, and the VLAN 99 are allocated to the port "6" of the switch 303.

The fact that the VLAN 99 is not allocated to the ports "0" and "1" indicates that the user terminals 340 are connected to the ports "0" and "1".

FIG. 9 is a diagram showing the configuration of a port information management table 2134 which is created for the switch 304 after a network configuration is entered by the administrator 1 according to the first embodiment of this invention.

The port information management table 2134 shows that a port "0" of the switch 304 is connected to an device other than the switch 300, a port "1" of the switch 304 is connected to an device other than the switch 300, and a port "6" of the switch 304 is connected to a port "2" of the switch 301.

The port information management table 2134 also shows that the VLAN 20 is allocated to the port "0" of the switch 304, the VLAN 10 is allocated to the port "1" of the switch 304, and the VLAN 10, the VLAN 20, and the VLAN 99 are allocated to the port "6" of the switch 304.

The fact that the VLAN 99 is not allocated to the ports "0" and "1" indicates that the user terminals 340 are connected to the ports "0" and "1".

FIGS. 10 to 13 are diagrams showing the configuration of the VLAN information management table 212 according to the first embodiment of this invention.

The VLAN information management table 212 is created for each switch 300 managed by the management server 2.

The VLAN information management table 212 contains in each entry a VLAN identifier 21201, a port identifier 21202, and an IP address 21203.

Registered as the VLAN identifier 21201 is an identifier unique to each VLAN that is defined to be allocated to the switch 300 for which the VLAN information management table 212 in question is created. Registered as the port identifier 21202 is an identifier unique to a port that is allocated a VLAN identified by the VLAN identifier 21201 of the same entry. Registered as the IP address 21203 is an IP address at which the switch 300 of this VLAN information management table 212 is accessed over a VLAN identified by the VLAN identifier 21201 of the same entry.

FIG. 10 is a diagram showing the configuration of a VLAN information management table 2121 which is created for the switch 301 after a network configuration is entered by the administrator 1 according to the first embodiment of this invention.

The VLAN information management table 2121 shows that the VLAN 10, the VLAN 20, and the VLAN 99 are defined to be allocated to the switch 301. According to the VLAN information management table 2121, the VLAN 10 is allocated to the port "1" and the port "2", the VLAN 20 is allocated to the port "1" and the port "2", and the VLAN 99 is allocated to the port "0", the port "1", and the port "2". The VLAN information management table 2121 also shows that the IP address of the switch 301 in the VLAN 10 is "192. 168. 10. 201", the IP address of the switch 301 in the VLAN 20 is "192. 168. 20. 201", and the IP address of the switch 301 in the VLAN 99 is "192. 168. 99. 1".

FIG. 11 is a diagram showing the configuration of a VLAN information management table 2122 which is created for the switch 302 after a network configuration is entered by the administrator 1 according to the first embodiment of this invention.

The VLAN information management table 2122 shows that the VLAN 99 is defined to be allocated to the switch 302. According to the VLAN information management table 2122, the VLAN 99 is allocated to the port "0" and the port "6". The VLAN information management table 2122 also shows that the IP address of the switch 302 in the VLAN 99 is "192. 168. 99. 2".

FIG. 12 is a diagram showing the configuration of a VLAN information management table 2123 which is created for the switch 303 after a network configuration is entered by the administrator 1 according to the first embodiment of this invention.

The VLAN information management table 2123 shows that the VLAN 10, the VLAN 20, and the VLAN 99 are defined to be allocated to the switch 303. According to the VLAN information management table 2123, the VLAN 10 is allocated to the port "0" and the port "6", the VLAN 20 is allocated to the port "1" and the port "6", and the VLAN 99 is allocated to the port "6". The VLAN information management table 2123 also shows that the IP address of the switch 303 in the VLAN 10 is "192. 168. 10. 203", the IP address of the switch 303 in the VLAN 20 is "192. 168. 20. 203", and the IP address of the switch 303 in the VLAN 99 is "192. 168. 99. 3".

FIG. 13 is a diagram showing the configuration of a VLAN information management table 2124 which is created for the switch 304 after a network configuration is entered by the administrator 1 according to the first embodiment of this invention.

The VLAN information management table 2124 shows that the VLAN 10, the VLAN 20, and the VLAN 99 are defined to be allocated to the switch 304. According to the VLAN information management table 2124, the VLAN 10 is allocated to the port "1" and the port "6", the VLAN 20 is allocated to the port "0" and the port "6", and the VLAN 99 is allocated to the port "6". The VLAN information management table 2124 also shows that the IP address of the switch 304 in the VLAN 10 is "192. 168. 10. 204", the IP address of the switch 304 in the VLAN 20 is "192. 168. 20. 204", and the IP address of the switch 304 in the VLAN 99 is "192. 168. 99. 4".

In FIGS. 9 to 13, the VLAN 99 is defined to be allocated to all of the switches 301 to 304 and IP addresses in the VLAN 99 are defined for all of the switches 301 to 304. This enables the management server 2 to access the switches 301 to 304 all.

FIG. 14 is a diagram illustrating the redundancy switch specifying screen 234 for specifying which switch 300 is to be provided redundancy according to the first embodiment of this invention.

The redundancy switch specifying screen 234 contains an edit window 231, an edit canvas 233, and a sub-menu 235.

The redundancy switch specifying screen 234 is the network configuration input screen 230 that is displayed as a result of the processing of S703 after the administrator 1 enters a network configuration, and is used by the administrator 1 to specify which switch 300 is to be provided redundancy.

The edit window 231 and the edit canvas 233 are the same as the window and the canvas in the network configuration input screen 230 of FIG. 5, and their descriptions are omitted here.

In the edit canvas 233, a network configuration entered by the administrator 1 in S701 is displayed.

The sub-menu 235 is displayed when the administrator 1 selects an icon of one switch 300 with a mouse. The sub-menu 235 includes "redundancy", "copy", "delete", and "property".

When the administrator 1 selects one switch 300, the icon of the selected switch 300 is displayed in an enhanced manner. Examples of how to display the icon of the selected switch 300 in an enhanced manner include drawing a dotted line or the like around the icon of the switch 300.

The sub-menu 235 is displayed near the icon of the switch 300 displayed in an enhanced manner. When the administrator 1 selects "redundancy", the switch 300 represented by this icon is chosen as the switch 300 that is to be provided redundancy.

The management server 2 searches for an identifier unique to the switch 300 chosen as the switch 300 that is to be provided redundancy.

In this embodiment, the switch 300 that is to be provided redundancy is selected with a mouse. Alternatively, the administrator 1 may enter the identifier of the switch 300 that is to be provided redundancy with a keyboard.

With a user interface put between the server and the administrator such as this redundancy switch specifying screen, this invention makes it possible to design a redundancy configuration network by selecting which switch in the network is to be provided redundancy on the screen, instead of requiring the administrator to set individual switches as in prior art. This invention accordingly has an effect of reducing errors made by the administrator in designing a redundancy configuration network and thus enhancing the reliability of redundancy configuration network designing. More specifically, this invention has an effect of reducing design errors by displaying a network to be designed on the screen with the use of graphics and thus enabling the administrator to intuitively select a switch that is to be provided redundancy.

Figure 15:
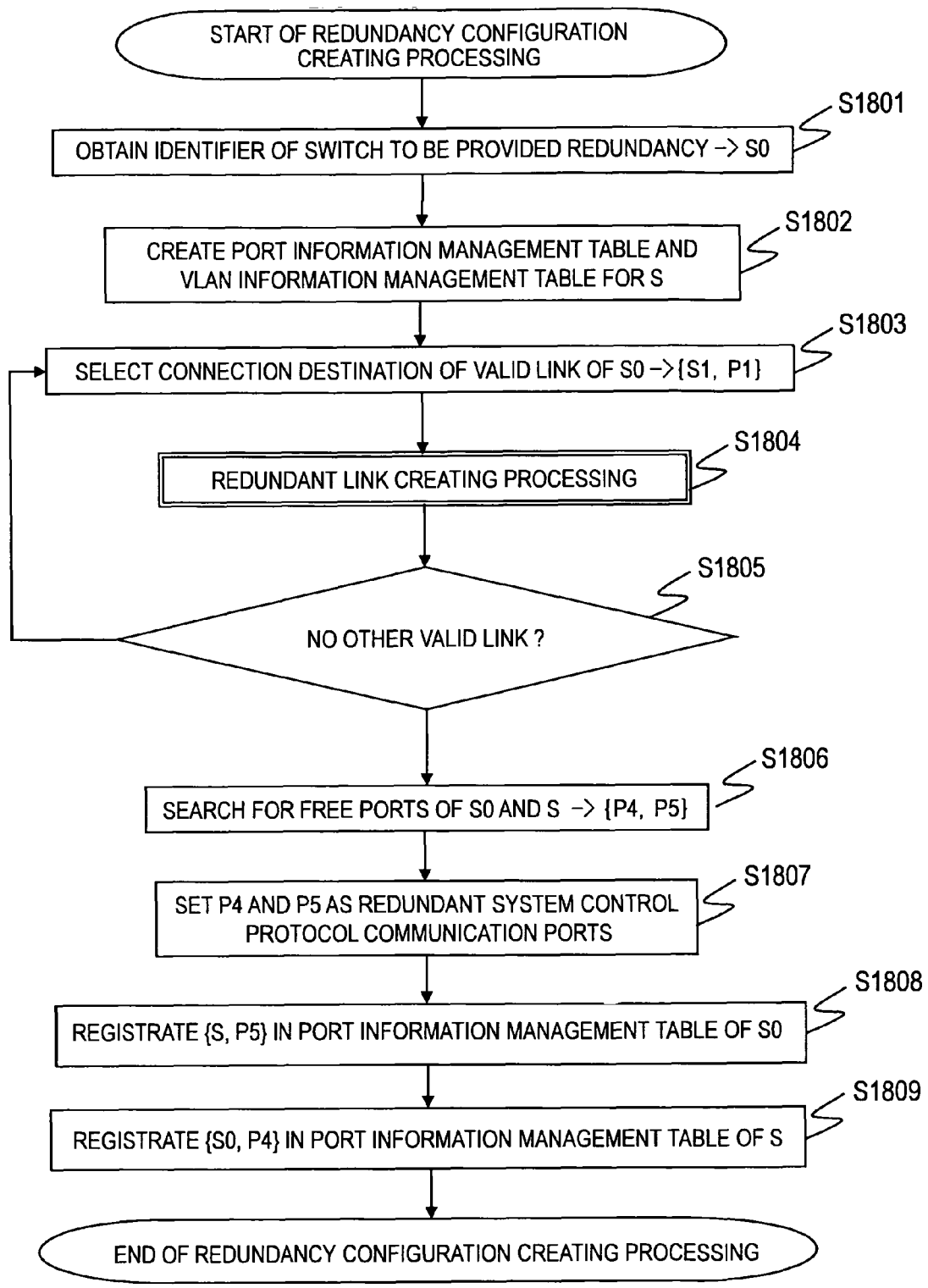
FIG. 15 is a flow chart of redundancy configuration creating processing according to the first embodiment of this invention.

FIG. 15 is a flow chart of redundancy configuration creating processing according to the first embodiment of this invention.

The redundancy configuration creating processing is executed by the CPU 24 by running the redundancy configuration creating program 211. The redundancy configuration creating processing is the processing of S703 shown in FIG. 4.

First, the administrator 1 specifies which switch 300 is to be provided redundancy through the redundancy switch specifying screen 234. The CPU 24 obtains the identifier of the switch 300 specified as a switch to be provided redundancy (S1801). The CPU 24 keeps the identifier of the switch 300 that is obtained in S1801 as S0.

The CPU 24 then creates, in the memory 20, the port information management table 213 and the VLAN information management table 212 for a new switch 300 (S) which constitutes redundancy switches together with the switch 300 (S0) to be provided redundancy (S1802).

The CPU 24 next chooses, from the port information management table 213 for the switch 300 (S0) to be provided redundancy, one connected switch 300 which is connected to the switch 300 (S0) to be provided redundancy, and obtains the identifier of the connected switch 300 as well as the identifier of one of ports of the connected switch 300 that is connected to the switch 300 (S0) to be provided redundancy (S1803). The CPU 24 keeps the switch identifier obtained in S1802 as S1, and keeps the port identifier obtained in S1802 as P1. The connection between the switch 300 (S0) to be provided redundancy and the connected switch 300 (S1) is called a valid link. Therefore, the connection between the switch 300 (S0) to be provided redundancy and the user terminals 340 is not a valid link.

Specifically, the CPU 24 chooses, from entries of the port information management table 213 for the switch 300 (S0) to be provided redundancy, one entry in which the identifier of another switch 300 is registered as the connected node identifier 21302. The CPU 24 obtains the switch identifier registered as the connected node identifier 21302 in the chosen entry and a port identifier registered as the connected port identifier 21303 in the chosen entry.

Figure 16:
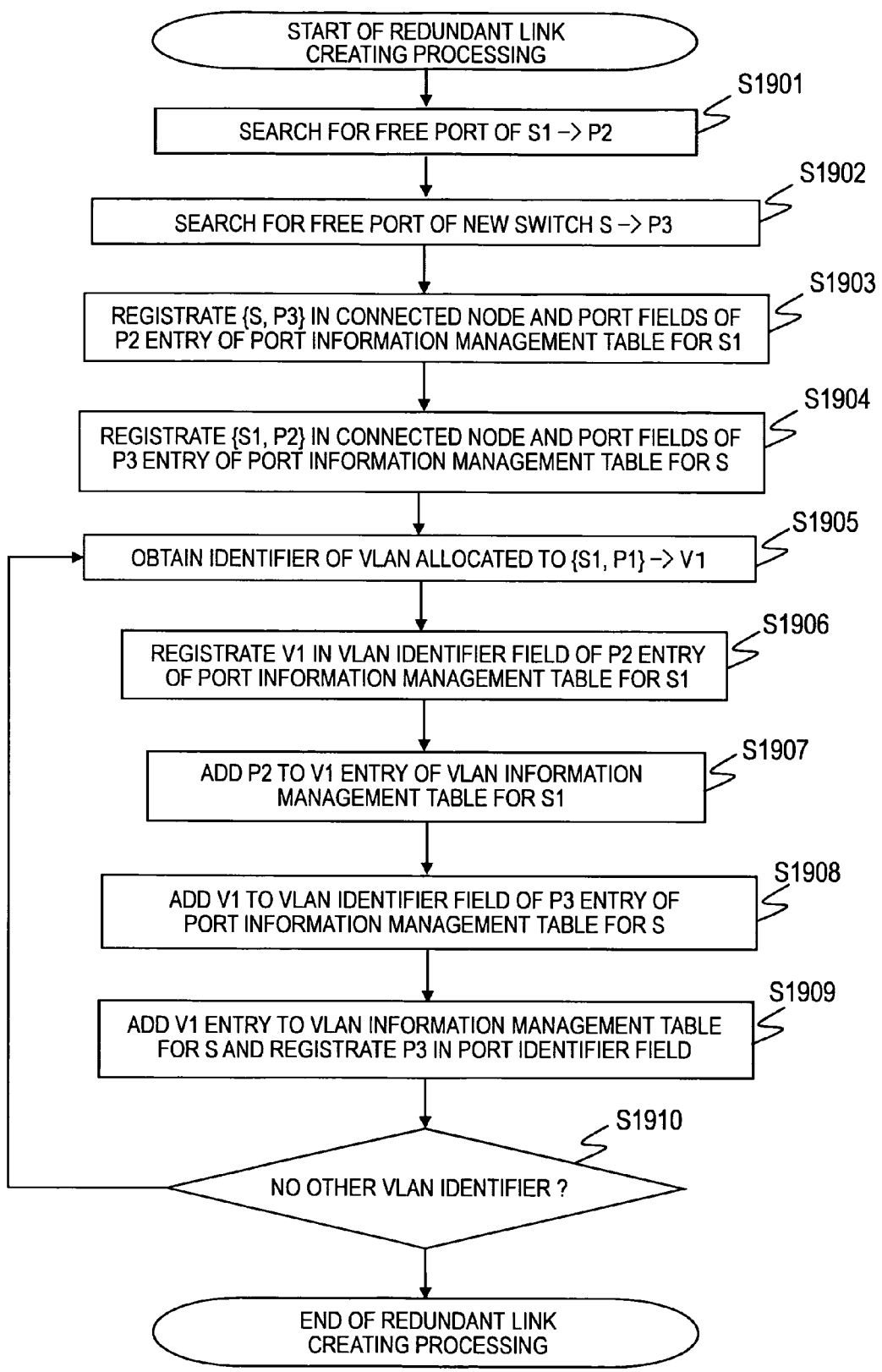
FIG. 16 is a flow chart of redundant link creating processing according to the first embodiment of this invention.

The CPU 24 refers to the identifier S1 of the switch 300 and the port identifier P1 which are obtained in S1803, executes redundant link creating processing shown in FIG. 16 (S1804), and updates the port information management table 213 and VLAN information management table 212 of the connected switch 300 (S1) as well as the port information management table 213 and VLAN information management table 212 of the new switch 300 (S).

The CPU 24 next judges whether or not the redundant link creating processing has been executed for every valid link of the switch 300 (S0) to be provided redundancy (S1805).

When it is judged in S1805 that not all of the valid links of the switch 300 (S0) to be provided redundancy have finished the redundant link creating processing, the CPU 24 returns to S1803 to choose one link out of the valid links for which the redundant link creating processing has not been executed yet.

When it is judged in S1805 that all of the valid links of the switch 300 (S0) to be provided redundancy have received the redundant link creating processing, the CPU 24 creates settings of a redundant system control protocol.

First, the CPU 24 refers to the port information management table 213 for the switch 300 (S0) to be provided redundancy to choose one free port which is not connected to any network device out of the ports of the switch 300 (S0) to be provided redundancy, and obtains the identifier of the chosen free port. The CPU 24 also refers to the port information management table 213 for the new switch 300 (S) to choose one free port which is not connected to any device out of the ports of the new switch 300 (S), and obtains the identifier of the chosen free port (S1806). The CPU 24 keeps the identifier of the free port of the switch 300 (S0) to be provided redundancy as P4 and keeps the identifier of the free port of the new switch 300 (S) as P5.

In obtaining a free port of the new switch 300 (S), the CPU 24 chooses a port that shares the same identifier with the obtained free port of the switch 300 (S0) to be provided redundancy, if there is such a port.

This makes the identifier of the port of the new switch 300 (S) that is connected to the switch 300 (S0) to be provided redundancy the same as the identifier of the port of the switch 300 (S0) to be provided redundancy that is connected to the new switch 300 (S). The administrator 1 can thus easily understand the connection relation between the connected switch 300 (S1) and the switches 300 that constitute redundancy switches (the switch 300 (S0) to be provided redundancy and the new switch 300 (S)).

Next, the CPU 24 sets, as ports to which the redundant system control protocol is applied, the port of the switch 300 (S0) to be provided redundancy that is identified by the port identifier obtained in S1806 (the port P4) and the port of the new switch 300 (S) that is identified by the port identifier obtained in S1806 (the port P5) (S1807).

Specifically, the CPU 24 registers the identifier of a VLAN for redundant system control protocol communication as the VLAN identifier 21304 in an entry of the port information management table 213 for the switch 300 (S0) to be provided redundancy whose port identifier 21301 matches the free port identifier (P4) obtained in S1806. The CPU 24 also registers the identifier of the VLAN for redundant system control protocol communication as the VLAN identifier 21304 in an entry of the port information management table 213 for the new switch 300 (S) whose port identifier 21301 matches the free port identifier (P5) obtained in S1806.

The CPU 24 then adds an entry holding the identifier of the redundant system control protocol communication VLAN as the VLAN identifier 21201 to the VLAN information management table 212 for the switch 300 (S0) to be provided redundancy. In the added entry, the CPU 24 registers as the port identifier 21202 the free port identifier (P4) obtained in S1806 and, as the IP address 21203, an IP address unique to the switch 300 (S0) to be provided redundancy in the redundant system control protocol communication VLAN.

The CPU 24 also adds an entry holding the identifier of the redundant system control protocol communication VLAN as the VLAN identifier 21201 to the VLAN information management table 212 for the new switch 300 (S). In the added entry, the CPU 24 registers as the port identifier 21202 the free port identifier (P5) obtained in S1806 and, as the IP address 21203, an IP address unique to the new switch 300 (S) in the redundant system control protocol communication VLAN.

The CPU 24 subsequently updates the redundant system management table 214 shown in FIG. 28. Specifically, the CPU 24 registers an identifier unique to a redundancy pair that is formed of the switch 300 (S0) to be provided redundancy and the new switch 300 (S) as a pair identifier 21401. As a first node identifier 21402 and a first port identifier 21403, the CPU 24 registers the identifier of one of the switches 300 constituting the redundancy pair and the identifier of one of ports of the switch 300 identified by the first node identifier 21402 that is connected to the other switch 300 constituting the redundancy pair, respectively. As a second node identifier 21404 and a second port identifier 21405, the CPU 24 registers the identifier of the other switch 300 constituting the redundancy pair and the identifier of one of ports of the switch 300 identified by the second node identifier 21404 that is connected to the switch 300 identified by the first node identifier 21402, respectively.

The CPU 24 next updates the port information management table 213 for the switch 300 (S0) to be provided redundancy (S1808). Specifically, the CPU 24 chooses an entry of the port information management table 213 for the switch 300 (S0) to be provided redundancy whose port identifier 21301 matches the port identifier (P4) of the switch 300 (S0) to be provided redundancy which has been obtained in S1806. In the chosen entry, the CPU 24 registers the identifier of the new switch 300 (S) as the connected node identifier 21302, and the free port identifier (P5) of the new switch 300 (S) as the connected port identifier 21303.

The CPU 24 also updates the port information management table 213 for the new switch 300 (S) (S1809). Specifically, the CPU 24 chooses an entry of the port information management table 213 for the new switch 300 (S) whose port identifier 21301 matches the port identifier (P5) of the new switch 300 (S) which has been obtained in S1806. In the chosen entry, the CPU 24 registers the identifier of the switch 300 (S0) to be provided redundancy as the connected node identifier 21302, and the free port identifier (P4) of the switch 300 (S0) to be provided redundancy as the connected port identifier 21303.

The CPU 24 ends the redundancy configuration creating processing after executing S1809.

FIG. 16 is a flow chart of redundant link creating processing according to the first embodiment of this invention.

The redundant link creating processing is executed by the CPU 24 by running the redundancy configuration settings creating program 211. The redundant link creating processing is the processing of S1804 shown in FIG. 15.

The CPU 24 executes S1901 to S1904 to set the connection relation between the connected switch 300 (S1) and the new switch 300 (S) in the port information management table 213 for the connected switch 300 (S1) and the port information management table 213 for the new switch 300 (S).

First, the CPU 24 chooses one free port which is not connected to any network device out of the ports of the connected switch 300 (S1), and obtains the identifier of the chosen free port (S1901). The CPU 24 keeps the identifier of the free port of the connected switch 300 (S1) as P2.

The following describes how the CPU 24 obtains a free port of the connected switch 300 (S1) specifically.

The CPU 24 first judges whether or not a port of the connected switch 300 (S1) is a free port. The identifier of this port has the number immediately preceding or following the port identifier (P1) of the port that has been chosen as one connected to the switch 300 (S0) to be provided redundancy in S1803 of the redundancy configuration creating processing shown in FIG. 15.

When the port whose identifier has the number immediately preceding or following the port identifier (P1) is a free port, the CPU 24 obtains the identifier of this port.

When the port whose identifier has the number immediately preceding or following the port identifier (P1) is not a free port, the CPU 24 judges whether or not another port is a free port.

This way, when the port whose identifier has the number immediately preceding or following the port identifier (P1) is a free port, the identifier of the port (P1) of the connected switch 300 (S1) that is connected to the switch 300 (S0) to be provided redundancy has the number immediately preceding or following the identifier of the port (P2) of the connected switch 300 (S1) that is connected to the new switch 300 (S). The administrator 1 can thus easily understand the connection relation between the connected switch 300 (S1) and the switches 300 that constitute redundancy switches (the switch 300 (S0) to be provided redundancy and the new switch 300 (S)).

The CPU 24 next chooses one free port which is not connected to any network device out of the ports of the new switch 300 (S), and obtains the identifier of the chosen free port (S1902). The CPU 24 keeps the identifier of the free port of the new switch 300 (S) as P3.

The following describes how the CPU 24 obtains a free port of the new switch 300 (S) specifically.

The CPU 24 first judges whether or not a port of the new switch 300 (S) is a free port. This port shares the same port identifier with the port of the switch 300 (S0) to be provided redundancy that is connected to the connected switch 300 (S1).

When the port that shares the same port identifier with the port connected to the connected switch 300 (S1) is a free port, the CPU 24 obtains the identifier of this port.

When the port that shares the same port identifier with the port connected to the connected switch 300 (S1) is not a free port, the CPU 24 judges whether or not another port is a free port.

This way, when a free port of the new switch 300 (S) is identified by the same port identifier as the port of the switch 300 (S0) to be provided redundancy that is connected to the connected switch 300 (S1), the port of the new switch 300 (S) that is connected to the connected switch 300 (S1) and the port of the switch 300 (S0) to be provided redundancy that is connected to the connected switch 300 (S1) share the same identifier. The administrator 1 can thus easily understand the connection relation between the connected switch 300 (S1) and the switches 300 that constitute redundancy switches (the switch 300 (S0) to be provided redundancy and the new switch 300 (S)).

The CPU 24 next chooses an entry of the port information management table 213 for the connected switch 300 (S1) whose port identifier 21301 matches the port identifier (P2) obtained in S1901. In the chosen entry, the CPU 24 registers the identifier of the new switch 300 (S) as the connected node identifier 21302 and the port identifier (P3) obtained in S1902 as the connected port identifier 21303 (S1903).

The CPU 24 chooses an entry of the port information management table 213 for the new switch 300 (S) whose port identifier 21301 matches the port identifier (P3) obtained in S1902. In the chosen entry, the CPU 24 registers the identifier of the connected switch 300 (S1) as the connected node identifier 21302 and the port identifier (P2) obtained in S1901 as the connected port identifier 21303 (S1904).

Processing of setting a VLAN to the new switch 300 (S) and the connected switch 300 (S1) will be described next.

First, the CPU 24 refers to the port information management table 213 for the connected switch 300 (S1) to choose one VLAN identifier from among the identifiers of VLANs that are allocated to the port (P1) chosen in S1803 (S1905). The CPU 24 keeps the identifier of the chosen VLAN as V1.

The CPU 24 executes S1906 and S1907 in order to allocate, to the port (P2) of the connected switch 300 (S1) that is connected to the new switch 300 (S), a VLAN allocated to a port of the connected switch 300 (S1) that is connected to the switch 300 that is connected to the switch 300 (S0) to be provided redundancy. The CPU 24 thereby updates the port information management table 213 for the connected switch 300 (S1) and the VLAN information management table 212 for the connected switch 300 (S1).

The CPU 24 chooses an entry of the port information management table 213 for the connected switch 300 (S1) whose port identifier 21301 matches the port identifier (P2) obtained in S1901. In the chosen entry, the CPU 24 registers the VLAN identifier (V1) obtained in S1905 as the VLAN identifier 21304.

The CPU 24 then chooses from the VLAN information management table 212 for the connected switch 300 (S1) an entry whose VLAN identifier 21201 matches the VLAN identifier (V1) obtained in S1905. In the chosen entry, the CPU 24 registers the port identifier (P2) obtained in S1901 as the port identifier 21202.

The CPU 24 next executes S1908 and S1909 in order to allocate, to the port (P3) of the new switch 300 (S) that is connected to the connected switch 300 (S1), a VLAN allocated to a port of the connected switch 300 (S1) that is connected to the switch 300 that is connected to the switch 300 (S0) to be provided redundancy. The CPU 24 thereby updates the port information management table 213 for the new switch 300 (S) and the VLAN information management table 212 for the new switch 300 (S).

The CPU 24 chooses an entry of the port information management table 213 for the new switch 300 (S) whose port identifier 21301 matches the port identifier (P3) obtained in S1902. In the chosen entry, the CPU 24 registers the VLAN identifier (V1) obtained in S1905 as the VLAN identifier 21304 (S1908).

The CPU 24 then chooses from the VLAN information management table 212 for the new switch 300 (S) an entry whose VLAN identifier 21201 matches the VLAN identifier (V1) obtained in S1905. In the chosen entry, the CPU 24 registers the port identifier (P3) obtained in S1902 as the port identifier 21202 (S1909).

In the case where the VLAN information management table 212 for the new switch 300 (S) does not have an entry whose VLAN identifier 21201 matches the VLAN identifier (V1) obtained in S1905, the CPU 24 adds an entry that holds as the VLAN identifier 21201 the VLAN identifier (V1) obtained in S1905. The CPU 24 registers, in the added entry, as the port identifier 21202, the port identifier (P3) obtained in S1902.

The CPU 24 next judges whether or not S1906 to S1909 have been executed for every VLAN identifier allocated to the port (P1) chosen in S1803 (S1910).

When it is judged that S1906 to S1909 have been executed for every VLAN identifier allocated to the port (P1) chosen in S1803, the CPU 24 ends the redundant link creating processing and moves on to S1805 shown in FIG. 15.

When it is judged that not all of the VLAN identifiers that are allocated to the port (P1) chosen in S1803 have finished S1906 to S1909, the CPU 24 returns to S1905 to obtain another VLAN identifier.

Figure 17:
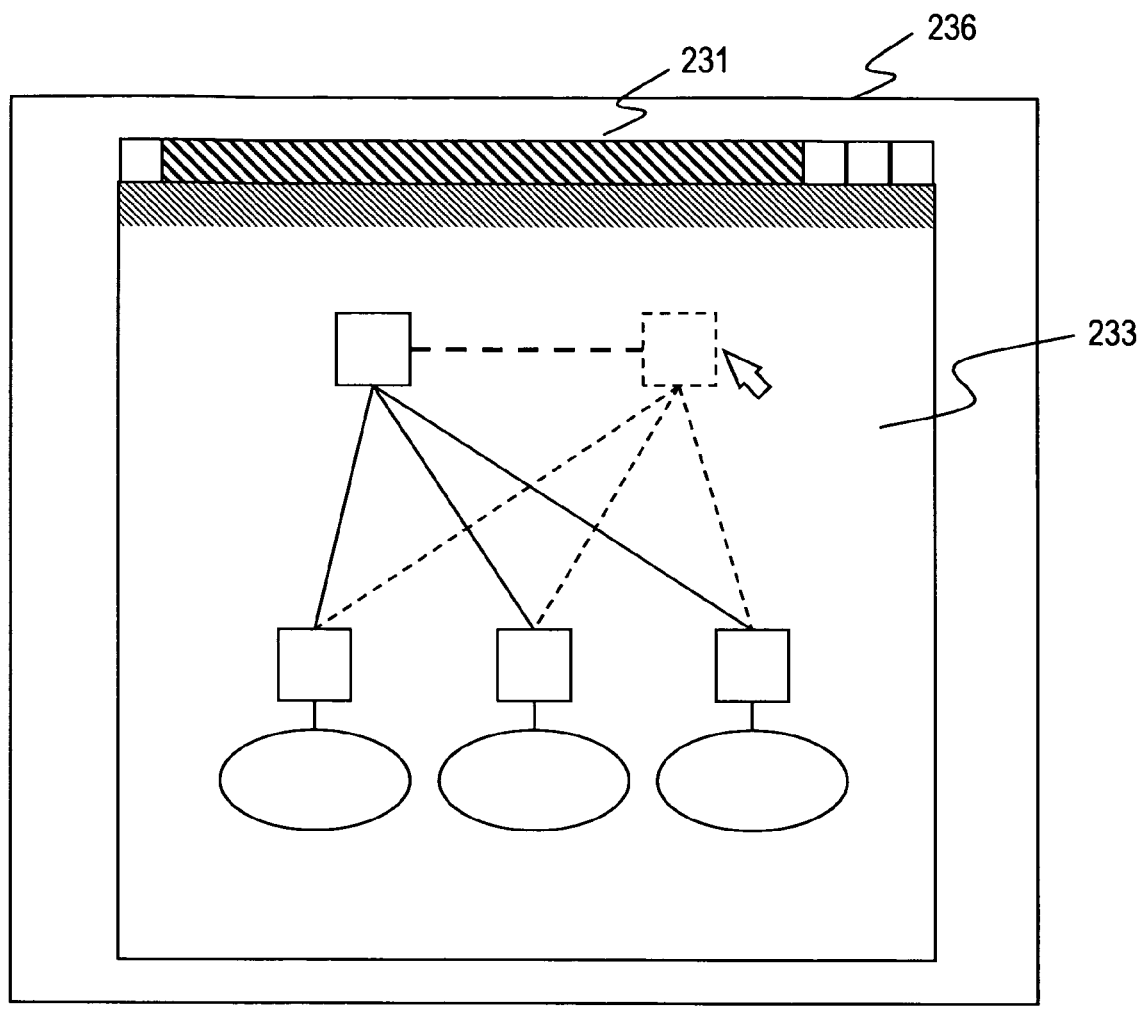
FIG. 17 is a diagram showing a redundant system display screen, which is used to check the network after the redundancy configuration creating processing is executed according to the first embodiment of this invention.

FIG. 17 is a diagram showing a redundant system display screen 236, which is used to check the network after the redundancy configuration creating processing is executed according to the first embodiment of this invention.

The redundant system display screen 236 contains an edit window 231 and an edit canvas 233.

The redundant system display screen 236 is a screen displayed based on the updated port information management table 213 and VLAN information management table 212 after the redundancy configuration creating processing shown in FIG. 4 is executed.

On the redundant system display screen 236, an icon of the new switch 300, which has been newly added to constitute one of redundancy switches, is displayed by a dotted line. Links of the new switch 300 to other switches 300 are also displayed by dotted lines. This enables the administrator 1 to easily understand a change brought by the addition of the new switch 300.

This invention thus has an effect of helping the administrator grasp design details intuitively by displaying the finished network configuration design on the redundant system display screen. Accordingly, the administrator can easily understand whether design details fit the design concept, which means that checking the final design details is easy and design errors are reduced.

Described next with reference to FIGS. 18 to 28 are the port information management tables 213 and VLAN information management tables 212 for the switches 301 to 305 and the redundant system management table 214 that have been updated as a result of the CPU 24 executing the redundancy configuration creating processing when the administrator 1 designates the switch 301 as the switch 300 to be provided redundancy and the switch 305 as the new switch 300 in FIG. 2. The switch 300 to be provided redundancy will be referred to as the switch 301 to be provided redundancy and the new switch 300 will be referred to as the new switch 305.

The port information management table 2131 and VLAN information management table 2121 for the switch 301 to be provided redundancy that have been updated through the redundancy configuration creating processing will be described first with reference to FIGS. 18 and 26.

FIG. 18 is a diagram showing the port information management table 2131 for the switch 301 to be provided redundancy that has been updated through the redundancy configuration creating processing according to the first embodiment of this invention.

The port information management table 2131 for the switch 301 to be provided redundancy is updated in S1807 and S1808.

Specifically, in S1808, an identifier "305" of the new switch 305 is registered as the connected node identifier 21302 in an entry whose port identifier 21301 is "7". As the connected port identifier 21303 of this entry, "7" is registered which is the identifier of the port of the new switch 305 that is connected to the switch 301 to be provided redundancy. In S1807, an identifier "200" of the redundant system control protocol communication VLAN is registered as the VLAN identifier 21304 of this entry.

FIG. 26 is a diagram showing the VLAN information management table 2121 for the switch 301 to be provided redundancy that has been updated through the redundancy configuration creating processing according to the first embodiment of this invention.

The VLAN information management table 2121 for the switch 301 to be provided redundancy is updated in S1807.

Specifically, S1807 adds an entry whose VLAN identifier 21201 is the identifier "200" of the redundant system control protocol communication VLAN. In this entry, the identifier "7" of the port of the switch 301 to be provided redundancy that is connected to the new switch 305 is registered as the port identifier 21202, and an IP address "192. 168. 200. 1" unique to the switch 301 to be provided redundancy in the VLAN "200" is registered as the IP address 21203.

A port information management table 2132 and VLAN information management table 2122 for the switch 302 that have been updated through the redundancy configuration creating processing will be described next with reference to FIGS. 19 and 23.

FIG. 19 is a diagram showing the port information management table 2132 for the switch 302 that has been updated through the redundancy configuration creating processing according to the first embodiment of this invention.

The switch 302 is the connected switch 300 that is connected to the switch 301 to be provided redundancy. With the switch 302 being the connected switch 300, an identifier "302" of the switch 302 and an identifier "6" of the port of the switch 302 that is connected to the switch 301 to be provided redundancy are chosen in S1803 of FIG. 15.

In S1901 of FIG. 16, a port identifier "7" immediately following the identifier "6" of the port of the switch 302 that is connected to the switch 301 to be provided redundancy is obtained as a free port identifier. In S1903, the identifier "305" of the new switch 305 is registered as the connected node identifier 21302 and an identifier "0" of a port of the new switch 305 which is obtained as a free port in S1902 is registered as the connected port identifier 21303 in an entry of the port information management table 2132 whose port identifier 21301 is "7".

The CPU 24 obtains, in S1902, as a free port, a port of the new switch 305 that is identified by the port identifier "0", the same as the port identifier "0" of the port of the switch 301 to be provided redundancy that is connected to the switch 302. In other words, a port of the new switch 305 that is identified by the port identifier "0" is connected to the switch 302.

Therefore, the identifier "0" of the port of the new switch 305 is registered as the connected port identifier 21303 in the port information management table 2132 for the switch 302.

In S1905 of FIG. 16, the CPU 24 obtains the identifier "99" of the VLAN allocated to the port "6" of the switch 302 that is connected to the switch 301 to be provided redundancy.

In S1906, the VLAN identifier "99" obtained in S1905 is registered as the VLAN identifier 21304 in an entry of the port information management table 2132 whose port identifier 21301 is "7".

FIG. 23 is a diagram showing the VLAN information management table 2122 for the switch 302 that has been updated through the redundancy configuration creating processing according to the first embodiment of this invention.

In S1907 of FIG. 16, the identifier "7" of the port obtained in S1902 as a free port of the new switch 305 is registered as the port identifier 21202 in an entry of the VLAN information management table 2122 whose VLAN identifier 21201 matches the VLAN identifier "99" obtained in S1905.

Through the above steps, the connection relation between the switch 302 and the new switch 305 is registered in the port information management table 2132 for the switch 302. Also, a VLAN allocated to the port "6" of the switch 302 which is connected to the switch 301 to be provided redundancy is allocated to the port "7" of the switch 302 which is connected to the new switch 305 in the port information management table 2132 and VLAN information management table 2122 for the switch 302.

A port information management table 2133 and VLAN information management table 2123 for the switch 303 that have been updated through the redundancy configuration creating processing will be described next with reference to FIGS. 20 and 24.

FIG. 20 is a diagram showing the port information management table 2133 for the switch 303 that has been updated through the redundancy configuration creating processing according to the first embodiment of this invention.

The switch 303 is the connected switch 300 that is connected to the switch 301 to be provided redundancy. With the switch 303 being the connected switch 300, an identifier "303" of the switch 303 and an identifier "6" of the port of the switch 303 that is connected to the switch 301 to be provided redundancy are chosen in S1803 of FIG. 15.

As in FIG. 19, in S1903 of FIG. 16, the CPU 24 registers the identifier "305" of the new switch 305 as the connected node identifier 21302 and an identifier "1" of a port of the new switch 305 which is obtained as a free port in S1902 is registered as the connected port identifier 21303 in an entry of the port information management table 2133 whose port identifier 21301 is "7".

In S1906, as the VLAN identifier 21304 of this entry, the CPU 24 registers the identifiers "10", "20", and "99" of the VLANs that are allocated to the port "6" obtained in S1905.

FIG. 24 is a diagram showing the VLAN information management table 2123 for the switch 303 that has been updated through the redundancy configuration creating processing according to the first embodiment of this invention.

In S1907 of FIG. 16, the CPU 24 registers the port identifier "7" obtained in S1902 as the port identifier 21202 in every entry of the VLAN information management table 2123 whose VLAN identifier 21201 matches any one of the VLAN identifiers "10", "20", and "99" obtained in S1905.

Through the above steps, the connection relation between the switch 303 and the new switch 305 is registered in the port information management table 2133 for the switch 303. Also, a VLAN allocated to the port "6" of the switch 303 which is connected to the switch 301 to be provided redundancy is allocated to the port "7" of the switch 303 which is connected to the new switch 305 in the port information management table 2133 and VLAN information management table 2123 for the switch 303.

A port information management table 2134 and VLAN information management table 2124 for the switch 304 that have been updated through the redundancy configuration creating processing will be described next with reference to FIGS. 21 and 25.

FIG. 21 is a diagram showing the port information management table 2134 for the switch 304 that has been updated through the redundancy configuration creating processing according to the first embodiment of this invention.

The switch 304 is the connected switch 300 that is connected to the switch 301 to be provided redundancy. With the switch 304 being the connected switch 300, an identifier "304" of the switch 304 and an identifier "6" of the port of the switch 304 that is connected to the switch 301 to be provided redundancy are chosen in S1803 of FIG. 15.

As in FIG. 19, in S1903 of FIG. 16, the CPU 24 registers the identifier "305" of the new switch 305 as the connected node identifier 21302 and an identifier "2" of a port of the new switch 305 which is obtained as a free port in S1902 is registered as the connected port identifier 21303 in an entry of the port information management table 2134 whose port identifier 21301 is "7".

In S1906, as the VLAN identifier 21304 of this entry, the CPU 24 registers the identifiers "10", "20", and "99" of the VLANs that are allocated to the port "6" obtained in S1905.

FIG. 25 is a diagram showing the VLAN information management table 2124 for the switch 304 that has been updated through the redundancy configuration creating processing according to the first embodiment of this invention.

In S1907 of FIG. 16, the CPU 24 registers the port identifier "7" obtained in S1902 as the port identifier 21202 in every entry of the VLAN information management table 2124 whose VLAN identifier 21201 matches any one of the VLAN identifiers "10", "20", and "99" obtained in S1905.

Through the above steps, the connection relation between the switch 304 and the new switch 305 is registered in the port information management table 2134 for the switch 304. Also, a VLAN allocated to the port "6" of the switch 304 which is connected to the switch 301 to be provided redundancy is allocated to the port "7" of the switch 304 which is connected to the new switch 305 in the port information management table 2134 and VLAN information management table 2124 for the switch 304.

A port information management table 2135 and VLAN information management table 2125 for the switch 305 that have been updated through the redundancy configuration creating processing will be described next with reference to FIGS. 22 and 27.

FIG. 22 is a diagram showing the port information management table 2135 for the switch 305 that has been updated through the redundancy configuration creating processing according to the first embodiment of this invention.

In S1904 of FIG. 16, the identifiers of the switches 302, 303, and 304 connected to the switch 301 to be provided redundancy, and the identifiers of the ports of the switches 302, 303, and 304 that are connected to the switch 301 to be provided redundancy are registered as the connected node identifier 21302 and the connected port identifier 21303, respectively.

The ports of the switches 302, 303, and 304 that are connected to the new switch 305 are, as described with reference to FIGS. 19 to 22, the ports "7" immediately following the ports "6" of the switches 302, 303, and 304 that are connected to the switch 301 to be provided redundancy.

The port of the new switch 305 that is connected to the switch 302 is, as described with reference to FIG. 19, the port "0", the same as the port "0" of the switch 301 to be provided redundancy that is connected to the switch 302.

Similarly, the port of the new switch 305 that is connected to the switch 303 is the port "1" and the port of the new switch 305 that is connected to the switch 304 is the port "2".

The identifier "302" of the switch 302 and the port identifier "7" of the switch 302 are therefore registered as the connected node identifier 21302 and the connected port identifier 21303, respectively, in an entry of the port information management table 2135 whose port identifier 21301 is "0".

Similarly, the identifier "303" of the switch 303 and the port identifier "7" of the switch 303 are registered as the connected node identifier 21302 and the connected port identifier 21303, respectively, in an entry whose port identifier 21301 is "1". In an entry whose port identifier 21301 is "2", the identifier "304" of the switch 304 and the port identifier "7" of the switch 304 are registered as the connected node identifier 21302 and the connected port identifier 21303, respectively.

The CPU 24 next registers, as the VLAN identifier 21304, the identifiers of VLANs allocated to the ports "6" of the switches 302 to 304 which are connected to the switch 301 to be provided redundancy.

Specifically, "99" is registered as the VLAN identifier 21304 in an entry of the port information management table 2135 whose port identifier 21301 is "0". "10", "20", and "99" are registered as the VLAN identifier 21304 in an entry whose port identifier 21301 is "1". "10", "20", and "99" are registered as the VLAN identifier 21304 in an entry whose port identifier 21301 is "2".

In S1807 and S1809, the CPU 24 registers the identifier "301" of the switch 301 to be provided redundancy as the connected node identifier 21302, the port identifier "7" of the port of the switch 301 to be provided redundancy that is connected to the new switch 305 as the connected port identifier 21303, and the identifier "200" of the redundant system control protocol communication VLAN as the VLAN identifier 21304 in an entry of the port information management table 2135 whose port identifier 21301 is "7".

FIG. 27 is a diagram showing a VLAN information management table 2125 for the new switch 305 that has been updated through the redundancy configuration creating processing according to the first embodiment of this invention.

The VLAN information management table 2125 holds no values when created for the new switch 305 in S1802. In S1909, entries are added to register as the VLAN identifier 21201 the identifiers "10", "20", and "99" of the VLANs allocated to the ports "6" of the switches 302 to 304 which are connected to the switch 301 to be provided redundancy.

In the entry that has "10" as the VLAN identifier 21201, the identifiers "1" and "2" of the ports allocated the VLAN "10" are registered as the port identifier 21202. As the IP address 21203 of this entry, the CPU 24 registers an IP address "192.168.10.205" unique to the new switch 305 in the VLAN "10".

The entries that have respectively "20" and "99" as the VLAN identifier 21201 are set in a similar manner, and the description is therefore omitted.

The VLAN information management table 2125 is updated further in S1807.

Specifically, in S1807, the CPU 24 adds an entry whose VLAN identifier 21201 is the identifier "200" of the redundant system control protocol communication VLAN. In the added entry, the port identifier "7" of the port of the new switch 305 that is connected to the switch 301 to be provided redundancy is registered as the port identifier 21202, and an IP address "192.168.200.5" unique to the new switch 305 in the VLAN "200" is registered as the IP address 21203.

FIG. 28 is a diagram showing the redundant system management table 214 that has been updated through the redundancy configuration creating processing according to the first embodiment of this invention.

The redundant system management table 214 contains in each entry a pair identifier 21401, a first node identifier 21402, a first port identifier 21403, a second node identifier 21404, and a second port identifier 21405.

Registered as the pair identifier 21401 is an identifier unique throughout the network 4 to a specific combination of the switches 300 constituting redundancy switches.

Registered as the first node identifier 21402 is an identifier unique to one of the switches 300 constituting the redundancy switches.

Registered as the first port identifier 21403 is an identifier unique to a port of the one switch 300 constituting the redundancy switches that is connected to the other switch 300 constituting the redundancy switches.

Registered as the second node identifier 21404 is an identifier unique to the other of the switches 300 constituting the redundancy switches.

Registered as the second port identifier 21405 is an identifier unique to a port of the other switch 300 constituting the redundancy switches that is connected to the one switch 300 constituting the redundancy switches.

The identifier of either of two switches constituting redundancy switches can be registered as the first node identifier 21402 and the second node identifier 21404.

In S1807, the CPU 24 registers the identifier "301" of the switch 301 to be provided redundancy as the first node identifier 21402 and, as the first port identifier 21403, the port identifier "7" of the port of the switch 301 to be provided redundancy that is connected to the new switch 305. As the second node identifier 21404 and the second port identifier 21405, the CPU 24 registers the identifier "305" of the new switch 305 and the port identifier "7" of the port of the new switch 305 that is connected to the switch 301 to be provided redundancy, respectively.

The CPU 24 registers, as the pair identifier 21401, an identifier "1" unique to the redundancy switch pair formed of the switch 301 to be provided redundancy and the new switch 305.

The description given next with reference to FIGS. 29 to 33 is about update messages sent by the management server 2 to update the respective settings of the switches 301 to 305.

FIG. 29 is a diagram illustrating an update message 2051 for updating the settings of the switch 301 according to the first embodiment of this invention.

The update message 2051 is a message written in XML to deliver an instruction to allocate the VLAN "200" to the port of the switch 301 that is identified by the port identifier "7".

FIG. 30 is a diagram illustrating an update message 2052 for updating the settings of the switch 302 according to the first embodiment of this invention.

The update message 2052 is a message written in XML to deliver an instruction to allocate the VLAN "99" to the port of the switch 302 that is identified by the port identifier "7".

FIG. 31 is a diagram illustrating an update message 2053 for updating the settings of the switch 303 according to the first embodiment of this invention.

The update message 2053 is a message written in XML to deliver an instruction to allocate the VLAN "10", "20", and "99" to the port of the switch 303 that is identified by the port identifier "7".

FIG. 32 is a diagram illustrating an update message 2054 for updating the settings of the switch 304 according to the first embodiment of this invention.

The update message 2054 is a message written in XML to deliver an instruction to allocate the VLAN "10", "20", and "99" to the port of the switch 304 that is identified by the port identifier "7".

FIG. 33 is a diagram illustrating an update message 2055 for updating the settings of the switch 305 according to the first embodiment of this invention.

The update message 2055 is a message written in XML to deliver an instruction to allocate the VLAN "99" to the port of the switch 305 that is identified by the port identifier "0", to allocate the VLANs "10", "20", and "99" to the port of the switch 305 that is identified by the port identifier "1", to allocate the VLANs "10", "20", and "99" to the port of the switch 305 that is identified by the port identifier "2", and to allocate the VLAN "200" to the port of the switch 305 that is identified by the port identifier "7".

In the manner described above, the management server 2 updates the port information management table 213 and VLAN information management table 212 of each switch 300 based on an instruction given by the administrator 1 via the input/output device. The management server 2 thus automatically designs the connection relation between the new switch 300 and the existing switches 300, thereby making it unnecessary for the administrator 1 to design the connection relation between the new switch 300 and the existing switches 300.

The administrator 1 can update, via the management server 2, the automatically designed settings of the switches 301 to 305.

Second Embodiment

A second embodiment of this invention describes how the management server 2 designs the settings of the switches 300 automatically in the case where the administrator 1 selects two of the switches 300 constituting a network as the switches 300 that serve as redundancy switches.

The second embodiment will be described with reference to FIGS. 34 and 35.

Figure 34:
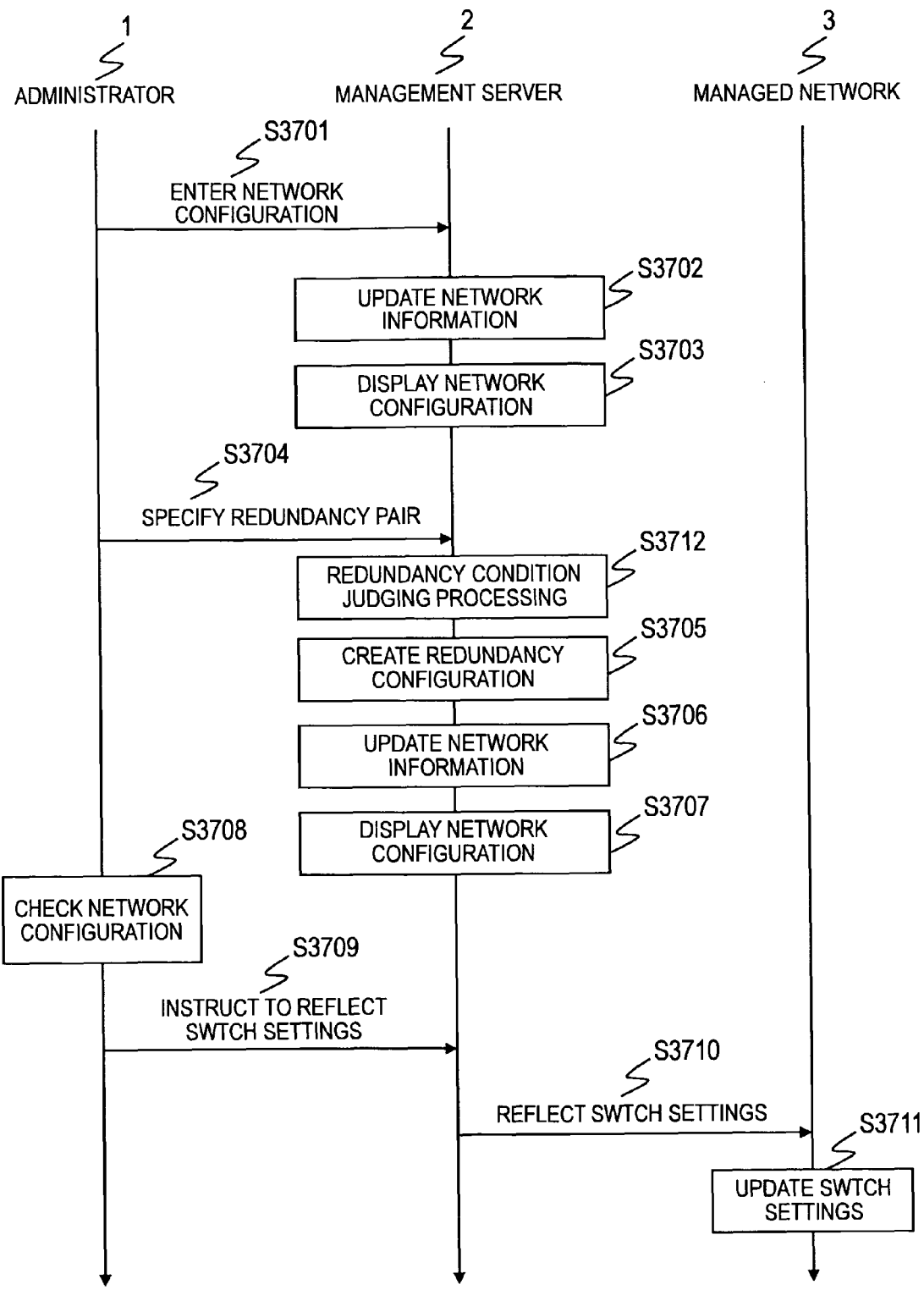
FIG. 34 is a sequence diagram of network designing in the management server when two of the switches constituting a network are selected as the switches that serve as redundancy switches according to the second embodiment of this invention.

FIG. 34 is a sequence diagram of network designing in the management server 2 when two of the switches 300 constituting a network are selected as the switches 300 that serve as redundancy switches according to the second embodiment of this invention.

First, as in S701 of FIG. 4, the administrator 1 enters a network configuration to the management server 2 (S3701).

Subsequently, as in S702 of FIG. 4, based on the entered network configuration, the management server 2 updates network information managed in the VLAN information management table 212, the port information management table 213, and the redundant system management table 214 (S3702).

As in S703 of FIG. 4, the management server 2 then displays the entered network configuration on the input/output device 23 (S3703).

The administrator 1 next designates two of the switches 300 constituting the network that is displayed in S3703 as redundancy switches (S3704).

In the first embodiment where the administrator 1 only designates the switch 300 to be provided redundancy, the switch 300 that constitutes redundancy switches together with the switch 300 to be provided redundancy is newly added to the network 4 as the new switch 300. In the second embodiment, on the other hand, the administrator 1 selects both of two switches 300 that constitute redundancy switches.

Next, the management server 2 judges whether or not the two switches 300 designated as redundancy switches meet a redundancy condition, which has to be fulfilled by the switches 300 to be capable of serving as redundancy switches (S3712). Details of this redundancy condition judging processing will be described with reference to FIG. 35.

When it is judged in S3712 that the two switches 300 designated as redundancy switches do not meet the redundancy condition, the management server 2 displays a message on the input/output device 23 to the effect that the designated two switches 300 cannot serve as redundancy switches.

When it is judged in S3712 that the two switches 300 designated as redundancy switches meet the redundancy condition, the management server 2 creates a network configuration necessary to apply the designated redundancy switches to the network (S3705).

Specifically, the CPU 24 executes the redundancy configuration creating processing shown in FIG. 15. In this embodiment, S1802 to S1805 of the redundancy configuration creating processing are not executed since the second embodiment does not need to set, in one of the switches 300 constituting redundancy switches, the connection relation between the other switch 300 constituting the redundancy switches and the connected switch 300 which is connected to the other switch 300.

In S1801, the CPU 24 obtains the identifiers of the two designated switches 300. The CPU 24 keeps the obtained identifier of one of the two switches 300 as S0 and the obtained identifier of the other switch 300 as S.

S1806 to S1809 in the second embodiment are the same as in the first embodiment, and the description is omitted here.

As in S706 of FIG. 4, the management server 2 updates network information managed in the VLAN information management table 212, the port information management table 213, and the redundant system management table 214 (S3706). As in S707 of FIG. 4, the management server 2 displays the updated network configuration on the input/output device 23 (S3707).

As in S708 of FIG. 4, the administrator 1 checks whether the network configuration that is displayed by the input/output device 23 matches the actual configuration of the network 4 (S3708).

As in S709 of FIG. 4, when the network configuration that is displayed by the input/output device 23 matches the actual configuration of the network 4, the administrator 1 instructs the management server 2 to update the settings of the respective switches 300 (S3709).

As in S710 of FIG. 4, receiving this instruction, the management server 2 sends an instruction to change the settings to the respective switches 300 (S3710). Each switch 300 that has received the instruction from the management server 2 updates its settings (S3711).

In this embodiment, a network configuration is entered to the management server 2 in S3701. Alternatively, the management server 2 may obtain network configuration information from the switches 300 constituting the network 4 to update network information managed in the VLAN information management table 212, the port information management table 213, and the redundant system management table 214.

Figure 35:
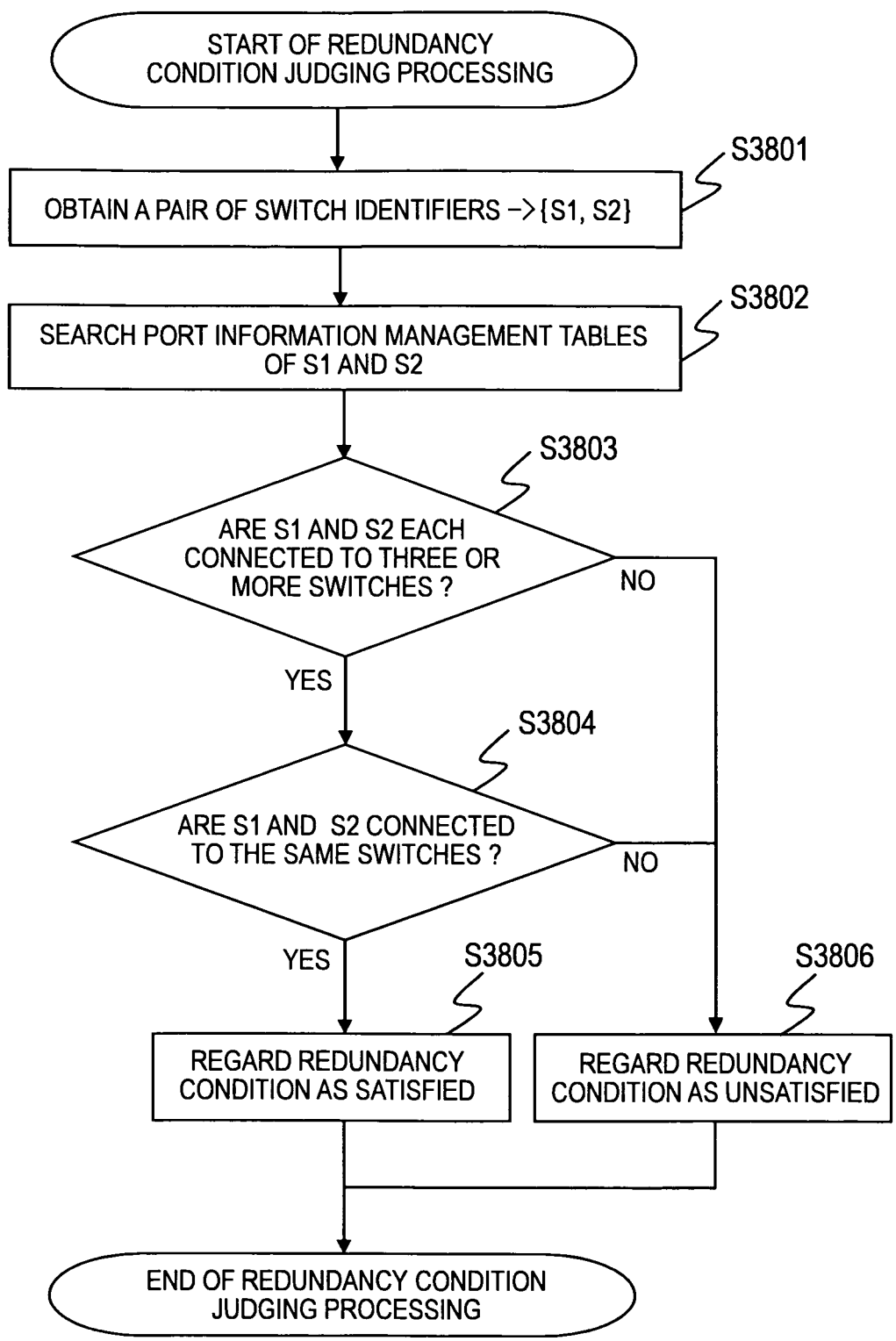
FIG. 35 is a flow chart showing redundancy condition judging processing according to the second embodiment of this invention.

FIG. 35 is a flow chart showing redundancy condition judging processing according to the second embodiment of this invention.

The redundancy condition judging processing is executed by the CPU 24 by running the redundancy configuration settings creating program 211.

First, at S3801, the CPU 24 obtains the identifiers of the two switches 300 specified in S3704. The CPU 24 keeps the identifier of one of the two specified switches 300 as S1 and keeps the identifier of the other switch 300 as S2.

The CPU 24 searches the port information management tables 213 of the two specified switches (S1 and S2) for the connected switch 300 that is connected to the switch 300 (S1) and the connected switch 300 that is connected to the switch 300 (S2) (S3802).

The CPU 24 judges whether or not the switch 300 (S1) and the switch 300 (S2) are each connected to three or more connected switches 300 (S3803).

To elaborate, the CPU 24 judges whether or not the switch 300 (S1) is connected to two switches 300 excluding the switch 300 (S2), and whether or not the switch 300 (S2) is connected to two switches 300 excluding the switch 300 (S1).

When it is judged in S3803 that at least one of the switch 300 (S1) and the switch 300 (S2) is connected to less than three connected switches 300, the CPU 24 determines that these two specified switches 300 do not meet the redundancy condition, and then ends the redundancy condition judging processing (S3806).

When it is judged in S3803 that the count of the connected switches 300 that are connected to the switch 300 (S1) and the count of the connected switches 300 that are connected to the switch 300 (S2) are each equal to or higher than three, the CPU 24 judges whether or not all the connected switches 300 that are connected to the switch 300 (S1) share the same identifiers with all the connected switches 300 that are connected to the switch 300 (S2) (S3804).

When it is judged in S3804 that at least one of the connected switches 300 that are connected to the switch 300 (S1) and one of the connected switches 300 that are connected to the switch 300 (S2) do not share the same identifier with each other, the CPU 24 determines that these two specified switches 300 do not meet the redundancy condition, and then ends the redundancy condition judging processing (S3806).

When it is judged in S3804 that all of the connected switches 300 that are connected to the switch 300 (S1) share the same identifiers with all of the connected switches 300 that are connected to the switch 300 (S2), the CPU 24 determines that these two specified switches 300 meet the redundancy condition, and then ends the redundancy condition judging processing (S3805).

In this way, a message to the effect that two switches 300 specified by the administrator 1 do not meet a redundancy condition is displayed on the input/output device 23 when at least one of the two specified switches 300 is connected to less than three connected switches 300, or when not all of the connected switches 300 that are connected to one of the two specified switches 300 share the same identifiers with the connected switches 300 that are connected to the other specified switch 300. The administrator 1 is thus prevented from setting wrong switches as redundancy switches.

Third Embodiment

A third embodiment of this invention will be described next with reference to FIG. 36.

In the third embodiment, the management server 2 creates redundancy switch settings based on link information that is sent from the new switch 300 when the new switch 300 is newly added to the network 4.

Figure 36:
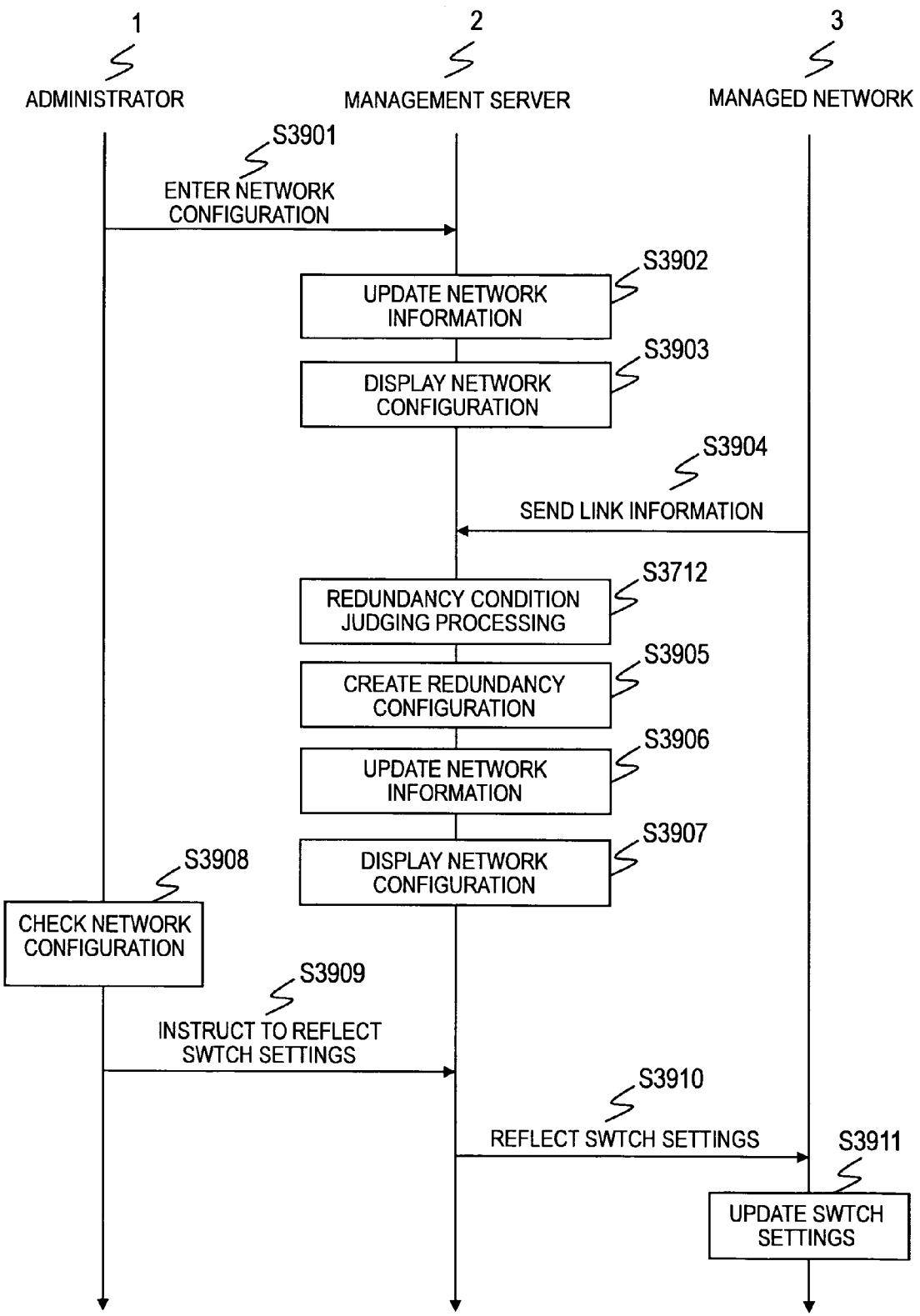
FIG. 36 is a sequence diagram of network designing in the management server according to the third embodiment of this invention.

FIG. 36 is a sequence diagram of network designing in the management server 2 according to the third embodiment of this invention.

S3901 to S3903 and S3905 to S3912 are the same as S3701 to S3703 and S3705 to S3712 described in the second embodiment with reference to the flow chart of FIG. 34, and the description will not be repeated.

In S3904, the new switch 300 sends link information to the management server 2 when connected to another switch 300. The switch 300 to which the new switch 300 is connected will be referred to as a connected switch 300.

The link information contains the identifier of the new switch 300, the identifier of one of the ports of the new switch 300 that is connected to the connected switch 300, the identifier of the connected switch 300, and the identifier of one of the ports of the connected switch 300 that is connected to the new switch 300.

The CPU 24 receives the link information. Based on the received link information, the CPU 24 updates the port information management table 213 for the new switch 300 and the port information management table 213 for the connected switch 300 to which the new switch 300 is connected.

Specifically, the CPU 24 registers the identifier of the connected switch 300 that is contained in the link information as the connected node identifier 21302 in an entry of the port information management table 213 for the new switch 300 whose port identifier 21301 matches the identifier of the port that is connected to the connected switch 300. As the connected port identifier 21303 of this entry, the CPU 24 registers the port identifier of the connected switch 300 that is contained in the link information as the identifier of a port connected to the new switch 300.

The CPU 24 next registers the identifier of the new switch 300 contained in the link information as the connected node identifier 21302 in an entry of the port information management table 213 for the connected switch 300 whose port identifier 21301 matches the identifier of the port that is connected to the new switch 300. As the connected port identifier 21303 of this entry, the CPU 24 registers the identifier of the new switch 300 that is contained in the link information. As the connected port identifier 21303 of this entry, the CPU 24 registers the port identifier of the new switch 300 that is contained in the link information as the identifier of a port connected to the connected switch 300.

The CPU 24 then executes the redundancy condition judging processing shown in FIG. 35 on the pair of the new switch 300 and the connected switch 300 (S3912).

When it is judged in S3912 that the new switch 300 and the connected switch 300 meet the redundancy condition, the CPU 24 proceeds to S3905. When it is judged in S3912 that at least one of the new switch 300 and the connected switch 300 does not meet the redundancy condition, the CPU 24 notifies the administrator 1 of this fact.

The following is a detailed description of S3905.

The CPU 24 executes the redundancy configuration creating processing shown in FIG. 15. In this embodiment where two switches 300 constituting redundancy switches are the new switch 300 and the connected switch 300 that is connected to the new switch 300, there is no need to set, in one of the switches 300 constituting redundancy switches, the connection relation between the other switch 300 constituting the redundancy switches and the connected switch 300 that is connected to the other switch 300. Accordingly, S1802 to S1805 of the redundancy configuration creating processing are not executed in this embodiment.

In S1801, the CPU 24 obtains the identifier of the new switch 300 and the identifier of the connected switch 300 connected to the new switch 300 from the received link information. The CPU 24 keeps the obtained identifier of one of the switches 300 as S0 and keeps the obtained identifier of the other switch 300 as S.

S1806 to S1809 in the third embodiment are the same as in the first embodiment, and the description is omitted here.

According to the third embodiment of this invention, when the administrator 1 connects a new standby switch to an existing network that is constituted of switches, a network in which redundant system control is in effect between an existing active switch and the newly installed standby switch is automatically designed. The third embodiment of this invention thus has effects of shortening the time required to build a redundancy configuration network, and reducing errors in setting VLANs to switches.

Fourth Embodiment

A fourth embodiment of this invention will be described next with reference to FIGS. 37 and 38.

In the fourth embodiment, the management server 2 creates redundancy switch settings by searching the switches 300 which are components of the network 4 for two switches 300 constituting redundancy switches (a redundancy pair) when an instruction to give the network 4 redundancy is received from the administrator 1.

Figure 37:
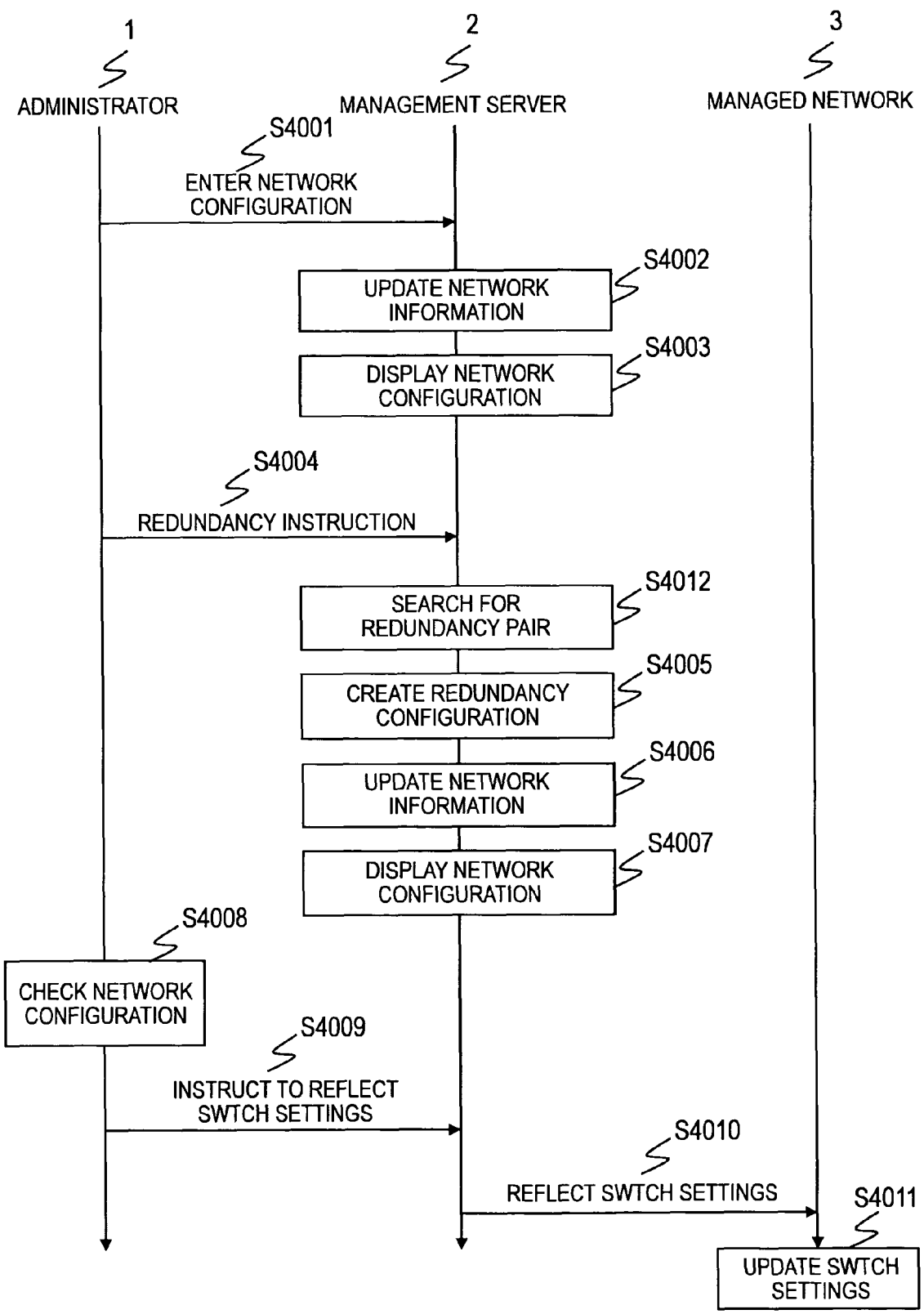
FIG. 37 is a sequence diagram of network designing in the management server according to the fourth embodiment of this invention; and, FIG. 38 is a flow chart of redundancy pair search processing according to the fourth embodiment of this invention.

FIG. 37 is a sequence diagram of network designing in the management server 2 according to the fourth embodiment of this invention.

S4001 to S4003 and S4005 to S4011 are the same as S3701 to S3703 and S3705 to S3711 described in the second embodiment with reference to the flow chart of FIG. 34, and the description will not be repeated.

The administrator 1 inputs an instruction to find a redundancy pair from among the switches 300 constituting the network 4 to the management server 2 (S4004).

The CPU 24 receives the input redundancy instruction and searches for a redundancy pair (S4012). Details of the redundancy pair search processing will be described with reference to FIG. 38.

The CPU 24 executes the redundancy configuration creating processing on two switches 300 found as a redundancy pair (S4005).

Specifically, the CPU 24 executes the redundancy configuration creating processing shown in FIG. 15. In this embodiment where two switches 300 constituting redundancy switches are the two switches 300 searched for as a redundancy pair, there is no need to set, in one of the switches 300 constituting redundancy switches, the connection relation between the other switch 300 constituting the redundancy switches and the connected switch 300 that is connected to the other switch 300. Accordingly, S1802 to S1805 of the redundancy configuration creating processing are not executed in this embodiment.

In S1801, the CPU 24 obtains the identifier of one of the switches 300 found as a redundancy pair and the identifier of the other switch 300 found as the redundancy pair. The CPU 24 keeps the obtained identifier of one of the switches 300 found as a redundancy pair as S0 and keeps the obtained identifier of the other switch 300 found as the redundancy pair as S.

S1806 to S1809 in the fourth embodiment are the same as in the first embodiment, and the description is omitted here.

Figure 38:
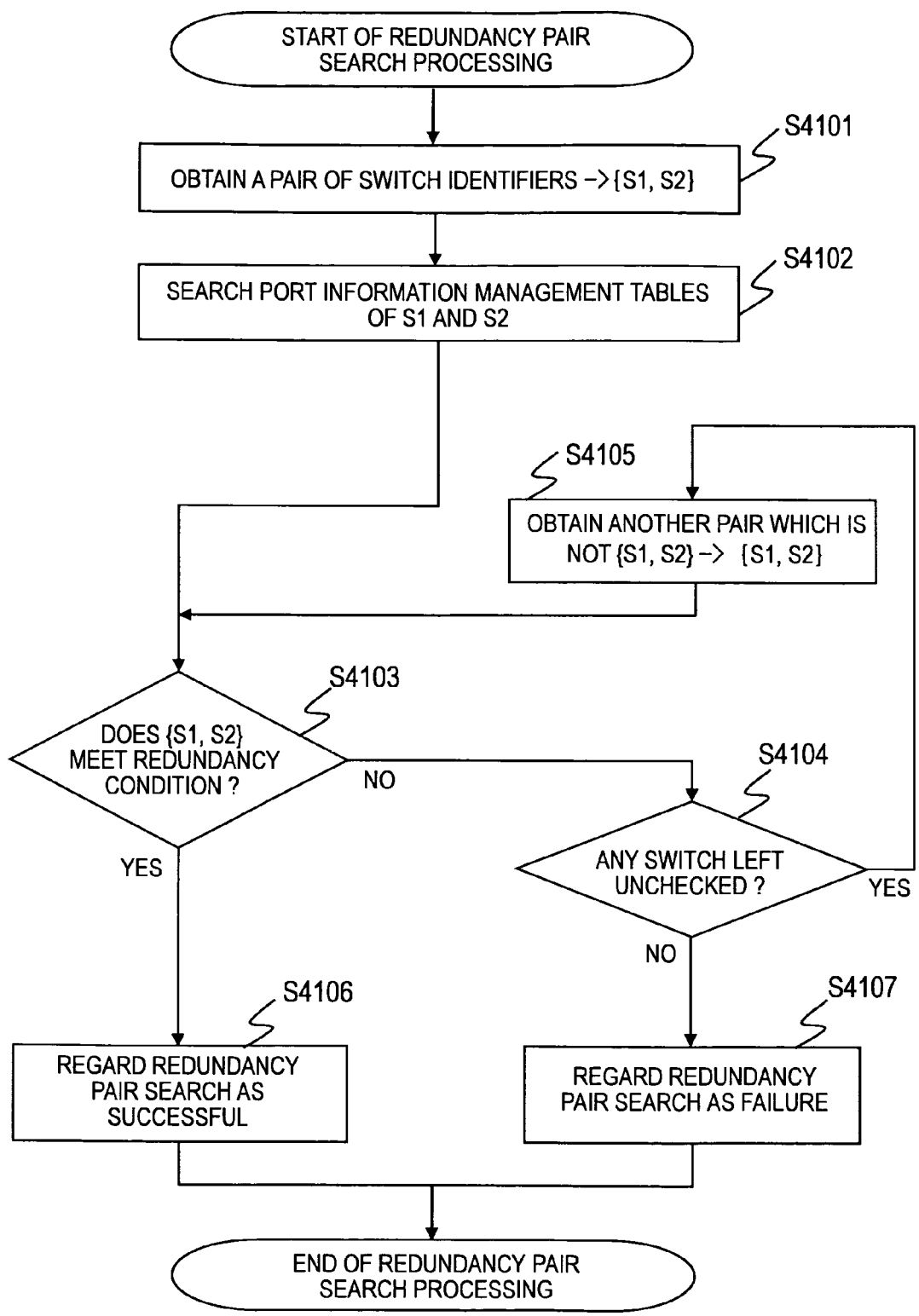

FIG. 38 is a flow chart of redundancy pair search processing according to the fourth embodiment of this invention.

First, the CPU 24 obtains the identifiers of two switches 300 out of the switches 300 constituting the network 4 (S4101). The CPU 24 keeps the obtained identifier of one of the two switches 300 as S1 and keeps the obtained identifier of the other switch 300 as S2.

Next, the CPU 24 searches the port information management tables 213 of the switches 300 that are identified by the obtained two identifiers (S1 and S2) (S4102).

The CPU 24 judges whether or not the switches 300 identified by the obtained identifiers (S1 and S2) meet the redundancy condition shown in FIG. 35 (S4103).

When it is judged in S4103 that the switches 300 identified by the obtained identifiers (S1 and S2) meet the redundancy condition, the CPU 24 determines that the redundancy pair search processing has been successful, and ends the redundancy pair search processing.

When it is judged in S4103 that the switches 300 identified by the obtained identifiers (S1 and S2) do not meet the redundancy condition, the CPU 24 judges whether or not there are other switches 300 that are candidates for a redundancy pair (S4104).

Specifically, the CPU 24 judges whether or not S4103 has been executed for every pair that is obtained by pairing two of the switches 300 constituting the network 4.

When it is judged in S4104 that there are other switches 300 that are candidates for a redundancy pair, the CPU 24 obtains the identifiers of two switches 300 that are a different pair from the pair of the two switches 300 whose identifiers have been obtained in S4101 (S4105). The CPU 24 keeps the newly obtained identifier of one of the two switches 300 as S1 and keeps the newly obtained identifier of the other switch 300 as S2.

The CPU 24 then executes S4103 for the switches 300 that are identified by the identifiers (S1 and S2) obtained in S4105.

This way, the administrator 1 only needs to input an instruction to find a redundancy pair to the management server 2, which searches for a redundancy pair, automatically creates settings necessary to give the network 4 redundancy for the respective switches 300, and updates the settings of the switches 300. The workload of the administrator 1 is thus reduced.

In this embodiment, S4103 is executed for every pair of the switches 300 constituting the network 4. The CPU 24 may instead execute S4103 for a pair of directly connected switches 300.

Specifically, in S4101 and S4105, the CPU 24 selects one switch 300 as a half of a pair and picks up the switch 300 that is connected directly to the former switch 300. The CPU 24 obtains the identifiers of the two selected switches 300.

The CPU 24 then judges in S4104 whether or not S4103 has been executed for every pair of directly connected switches 300.

This way, S4102 to S4107 are executed only for directly connected switches 300 instead of executing S4102 to S4107 to all the switches 300. The processing load of the CPU 24 is thus reduced.

This invention is applicable to management servers for managing networks, in particular, management servers for managing networks that have redundancy.

While the present invention has been described in detail and pictorially in the accompanying drawings, the present invention is not limited to such detail but covers various obvious modifications and equivalent arrangements, which fall within the purview of the appended claims.

What is claimed is:

1. A management computer connected to a plurality of nodes each having a plurality of ports, comprising:
   a transmission module for sending a configuration definition to each of the plurality of nodes;
   an input module for receiving an input of a first network configuration information including free port information of each of the plurality of nodes and information on a VLAN set between at least two of the plurality of nodes;
   a display module for using graphics representing the plurality of nodes and connection relations between the plurality of nodes to display second network configuration information reflecting the first network configuration information received by the input module; and
   a processing unit,
   wherein the input module further receives a selection of one of the plurality of nodes or one of the connection relations,
   wherein the processing unit
   creates a redundancy configuration between the selected one of the plurality of nodes and an unselected node among the plurality of nodes based on the free port information, and the information on the VLAN, and the second network configuration information, and
   updates the second network configuration information to third network configuration information based on the redundancy information,
   wherein the display module further displays the third network configuration information including the redundancy configuration with the use of graphics representing the plurality of nodes,
   wherein the input module further receives an input of a confirmation of the third network configuration information, and
   wherein, based on the input of the confirmation, the transmission module sends, to each of the plurality of nodes, respective configuration definitions of the plurality of nodes in the third network configuration information.

2. The management computer according to claim 1, further comprising:
   a memory for storing, as port management information, a connected node identifier, an allocated VLAN identifier, and an operation state of a redundant system control protocol in association with each of the plurality of ports of the plurality of nodes,
   wherein the processing unit is configured to:

search, in case that the input module receives an input of the first network configuration information, the port management information to make a list of connected nodes of the plurality of nodes;
search the port management information of each of the connected nodes to find a free port in each of the connected nodes;
allocate a free port of a redundancy node to the free port in each of the connected nodes;
create connection relation management information which is used to manage pairs of free ports associated with each other and connection relations between the free ports;
obtain port VLAN identifiers at both ends of the connection relations between the plurality of nodes and the connected nodes; and
store the port VLAN identifiers in association with the connection relations between the free ports of the connected nodes and the free ports of the redundancy nodes in the memory as VLAN management information.

3. The management computer according to claim 1, further comprising:
a memory for storing, as port management information, a connected node identifier, an allocated VLAN identifier, and an operation state of a redundant system control protocol in association with each of the plurality of ports of the plurality of nodes,
wherein the processing unit is configured to:
judge, in case that the input module receives a selection of a connection relation between a node to be provided redundancy and a connected node to which the node to be provided redundancy is connected, whether or not any one of the plurality of nodes has three or more links to other nodes, and whether or not all of connected nodes of the any one of the plurality of nodes have links to both the node to be provided redundancy and the connected node of the node to be provided redundancy; and
allocate, in case that these conditions are met, a VLAN identifier to interconnected ports of the node to be provided redundancy and the connected node of the node to be provided redundancy, and activate the redundant system control protocol.

4. The management computer according to claim 1, further comprising:
a memory for storing, as port management information, a connected node identifier, an allocated VLAN identifier, and an operation state of a redundant system control protocol in association with each of the plurality of ports of the plurality of nodes,
wherein the input module receives an instruction to put redundant system control in a network into effect, instead of receiving a selection of one of a node and a connection relation that is selected, out of the plurality of nodes and the connection relations, to be provided redundancy,
wherein the processing unit is configured to:
arbitrarily select, in case that the input module receives the instruction to put redundant system control in the network into effect, a first node and a second node which are adjacent to each other in the network;
judge whether or not any one of the plurality of nodes has three or more links to other nodes, and whether or not all of connected nodes of the any one of the plurality of nodes have links to both the first node and the second node; and
allocate, in case that these conditions are met, a VLAN identifier to interconnected ports of the first node and the second node as nodes to be provided redundancy, and activate the redundant system control protocol, whereas newly select, in case that the conditions are not met, two nodes which are a different pair from the first node and the second node and repeat this process.

5. The management computer according to claim 1, further comprising:
a memory for storing, as port management information, a connected node identifier, an allocated VLAN identifier, and an operation state of a redundant system control protocol in association with each of the plurality of ports of the plurality of nodes,
wherein the management computer is configured to:
obtain link state information which indicates link generation from the plurality of nodes in a network instead of receiving in the input module an input of the first network configuration information including free port information of each of the plurality of nodes and information on the VLAN set between at least two of the plurality of nodes;
extract a first node and a second node which are to be provided redundancy based on the link state information obtained;
search the port management information to check whether or not any one of the plurality of nodes has three or more links to other nodes, and whether or not all of connected nodes of the any one of the plurality of nodes have links to both the first node and the second node; and
allocate, in case that these conditions are met, a VLAN identifier to interconnected ports of the first node and the second node as nodes to be provided redundancy, and the redundant system control protocol is activated.

6. A method of setting a redundancy configuration to a management computer which is connected to a plurality of nodes each having a plurality of ports and which has a transmission module, an input module, a display module and a processing unit, comprising the steps of:
receiving in the input module an input of a first network configuration information including free port information of each of the plurality of nodes and information on a VLAN set between at least two of the plurality of nodes;
displaying, in the display module, with the use of graphics representing the plurality of nodes and connection relations between the plurality of nodes, second network configuration information reflecting the first network configuration information received as the input;
further receiving in the input module a selection of one of the plurality of nodes and one of the connection relations;
via the processing unit, creating a redundancy configuration between the selected one of the plurality of nodes and an unselected among the plurality of nodes based on the free port information, and the information on the VLAN, and the second network configuration, and updating the second network configuration information to third network configuration information based on the redundancy configuration;
further displaying in the display module the third network configuration information including the redundancy configuration with the use of graphics representing the plurality of nodes;
further receiving in the input module an input of a confirmation of the third network configuration information; and
sending, based on the input of the confirmation, respective configuration definitions of the plurality of nodes in the third network configuration information from the transmission module to each of the plurality of nodes.

7. A non-transitory computer-readable medium including at least one sequence of instructions,
wherein a computer system includes a management computer which is coupled to a plurality of nodes each having a plurality of ports via a network,
wherein the management computer including an interface coupled to the network, a processor coupled to the interface, a memory coupled to the processor, an input module, a display module, and a processing unit
wherein the instructions that, when executed, cause the management computer to:
receive in the input module an input of a first network configuration information containing free port information of each of the plurality of nodes and information on a VLAN set between at least two of the plurality of nodes;
display, in the display module, with the use of graphics representing the plurality of nodes and connection relations between the plurality of nodes, second network configuration information reflecting the first network configuration information received as the input;
further receive in the input module a selection of one of the plurality of nodes and one of the connection relations;
via the processing unit, create a redundancy configuration between the selected one of the plurality of nodes and an unselected among the plurality of nodes based on the free port information, and the information on the VLAN, and the second network configuration, and update the second network configuration information to third network configuration information based on the redundancy configuration;
further display in the display module the third network configuration information including the redundancy configuration with the use of graphics representing the plurality of nodes,
further receive in the input module an input of a confirmation of the third network configuration information; and
send, based on the input of the confirmation, respective configuration definitions of the plurality of nodes in the third network configuration information from the interface to each of the plurality of nodes.

* * * * *